(12) United States Patent
Sun et al.

(10) Patent No.: US 12,574,959 B2
(45) Date of Patent: *Mar. 10, 2026

(54) TECHNIQUE FOR DEVICE-TO-DEVICE COMMUNICATION BASED ON RADIO SIGNALS RECEIVED FROM ONE OR MORE RADIO SOURCES

(71) Applicant: Telefonaktiebolaget LM Ericsson (publ), Stockholm (SE)

(72) Inventors: Wanlu Sun, Solna (SE); Marco Belleschi, Solna (SE); Ricardo Blasco Serrano, Espoo (FI); Hieu Do, Järfälla (SE); Gabor Fodor, Hässelby (SE); Jingya Li, Gothenburg (SE); Stefano Sorrentino, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/761,973

(22) Filed: Jul. 2, 2024

(65) Prior Publication Data

US 2024/0357641 A1 Oct. 24, 2024

Related U.S. Application Data

(63) Continuation of application No. 17/949,148, filed on Sep. 20, 2022, now Pat. No. 12,058,732, which is a
(Continued)

(51) Int. Cl.
*H04W 74/04* (2009.01)
*H04B 7/06* (2006.01)
(Continued)

(52) U.S. Cl.
CPC ........ *H04W 74/04* (2013.01); *H04B 7/06952* (2023.05); *H04W 72/046* (2013.01); *H04W 74/006* (2013.01); *H04W 74/0808* (2013.01)

(58) Field of Classification Search
CPC . H04W 74/04; H04W 72/046; H04W 74/006; H04W 74/0808; H04B 7/0695
See application file for complete search history.

(56) References Cited

U.S. PATENT DOCUMENTS 9,839,018 B2 * 12/2017 Berggren .............. H04W 72/23
9,974,066 B2 * 5/2018 Novlan ................. H04W 72/23
(Continued)

FOREIGN PATENT DOCUMENTS

JP 2010516148 A 5/2010
JP 2010-263492 A 11/2010
(Continued)

OTHER PUBLICATIONS

Japanese Office Action, including English translation, for Japanese Patent Application No. 2020-548751 dated Nov. 24, 2021, 6 pages.
(Continued)

*Primary Examiner* — Jael M Ulysse
(74) *Attorney, Agent, or Firm* — Sage Patent Group

(57) ABSTRACT

A second user equipment can be configured to communicate with a first user equipment via sidelink. The second user equipment can receive, from the first user equipment, a first set of preferred radio resources. The second user equipment can determine a second set of radio resources based on radio signals received at the second user equipment. The second user equipment can select at least one radio resource for transmitting data to the first user equipment from within an intersection of the first set of preferred radio resources and the second set of radio resources.

22 Claims, 14 Drawing Sheets

100

Related U.S. Application Data continuation of application No. 15/775,651, filed as application No. PCT/EP2018/056683 on Mar. 16, 2018, now Pat. No. 11,483,861.

(51) Int. Cl.
| | | |
|---|---|---|
| *H04W 72/044* | (2023.01) | |
| *H04W 74/00* | (2009.01) | |
| *H04W 74/0808* | (2024.01) | |

(56) References Cited

U.S. PATENT DOCUMENTS

| | | | | |
|---|---|---|---|---|
| 10,251,160 | B2 * | 4/2019 | Jung | H04W 72/04 |
| 10,687,312 | B2 * | 6/2020 | Chae | H04W 72/02 |
| 11,044,748 | B2 * | 6/2021 | Cao | H04W 72/02 |
| 2003/0152086 | A1 | 8/2003 | El Batt | |
| 2009/0312044 | A1 * | 12/2009 | Hottinen | H04W 72/542 |
| | | | | 455/509 |
| 2011/0205968 | A1 | 8/2011 | Kim et al. | |
| 2011/0268101 | A1 * | 11/2011 | Wang | H04W 4/02 |
| | | | | 370/344 |
| 2011/0292895 | A1 | 12/2011 | Wager et al. | |
| 2012/0051293 | A1 | 3/2012 | Sakoda et al. | |
| 2012/0120907 | A1 * | 5/2012 | Kishigami | H04L 5/0051 |
| | | | | 370/329 |
| 2013/0156008 | A1 * | 6/2013 | Dinan | H04W 72/27 |
| | | | | 370/332 |
| 2014/0064203 | A1 * | 3/2014 | Seo | H04W 28/06 |
| | | | | 370/329 |
| 2014/0177564 | A1 * | 6/2014 | Ma | H04W 74/04 |
| | | | | 370/329 |
| 2015/0124737 | A1 * | 5/2015 | Lee | H04W 52/346 |
| | | | | 370/329 |
| 2015/0171944 | A1 * | 6/2015 | Kalhan | H04W 72/23 |
| | | | | 370/329 |
| 2015/0365942 | A1 * | 12/2015 | Niu | H04L 61/2514 |
| | | | | 370/330 |
| 2016/0112996 | A1 * | 4/2016 | Ou | H04W 24/10 |
| | | | | 370/329 |
| 2016/0128027 | A1 * | 5/2016 | Gulati | H04W 52/383 |
| | | | | 370/329 |
| 2016/0174174 | A1 * | 6/2016 | Chae | H04W 52/0216 |
| | | | | 370/350 |
| 2016/0255610 | A1 | 9/2016 | Li et al. | |
| 2016/0323923 | A1 * | 11/2016 | Wei | H04L 1/1812 |
| 2016/0353424 | A1 | 12/2016 | Stirling-Gallacher et al. | |
| 2016/0381666 | A1 * | 12/2016 | Kim | H04B 7/26 |
| | | | | 370/329 |
| 2017/0013628 | A1 * | 1/2017 | Kim | H04W 76/14 |
| 2017/0019937 | A1 * | 1/2017 | Kim | H04W 76/11 |
| 2017/0034800 | A1 * | 2/2017 | Abedini | H04W 56/0015 |
| 2017/0041971 | A1 * | 2/2017 | Kim | H04W 76/14 |
| 2017/0064638 | A1 * | 3/2017 | Li | H04W 52/10 |
| 2017/0141825 | A1 * | 5/2017 | Zhang | H04B 7/0626 |
| 2017/0181150 | A1 * | 6/2017 | Lee | H04W 76/11 |
| 2017/0208636 | A1 * | 7/2017 | Agiwal | H04W 48/10 |
| 2017/0230876 | A1 * | 8/2017 | Suzuki | H04W 72/20 |
| 2017/0230915 | A1 * | 8/2017 | Kim | H04L 5/003 |
| 2017/0238260 | A1 * | 8/2017 | Kim | H04L 1/1819 |
| | | | | 455/522 |
| 2017/0290020 | A1 * | 10/2017 | Aiba | H04J 11/00 |
| 2017/0290046 | A1 * | 10/2017 | Sun | H04W 72/0466 |
| 2017/0325277 | A1 * | 11/2017 | Fujishiro | H04W 4/06 |
| 2017/0347394 | A1 * | 11/2017 | Yasukawa | H04L 1/1896 |
| 2018/0048986 | A1 * | 2/2018 | Adachi | H04W 76/14 |
| 2018/0115990 | A1 * | 4/2018 | Abedini | H04L 27/2655 |
| 2018/0139769 | A1 * | 5/2018 | Lee | H04W 72/0453 |
| 2018/0145807 | A1 * | 5/2018 | Nagata | H04B 7/06952 |
| 2018/0213549 | A1 * | 7/2018 | Kim | H04W 4/40 |
| 2018/0338319 | A1 * | 11/2018 | Kim | H04W 72/20 |
| 2019/0116475 | A1 * | 4/2019 | Lee | H04W 72/542 |
| 2019/0140779 | A1 * | 5/2019 | Jia | H04B 1/69 |
| 2019/0200389 | A1 * | 6/2019 | Li | H04W 74/0808 |
| 2020/0053528 | A1 * | 2/2020 | Wang | H04W 4/40 |
| 2021/0112582 | A1 * | 4/2021 | Lee | H04W 72/535 |

FOREIGN PATENT DOCUMENTS

| | | | | |
|---|---|---|---|---|
| WO | 2014045345 | A | 3/2014 | |
| WO | 2016163509 | A | 10/2016 | |
| WO | WO-2016163509 | A1 * | 10/2016 | H04W 72/121 |
| WO | 2017/026455 | A1 | 2/2017 | |

OTHER PUBLICATIONS

International Search Report and Written Opinion of the International Searching Authority, PCT/EP2018/056683, Oct. 19, 2018, 17 pages.

Jain N et al, A multichannel CSMA MAC protocol with receiver-based channel selection for multihop wireless networks, Computer Communications and Networks, 2001. Proceedings. Oct. 15-17, 2001, Piscataway, NJ, USA, IEEE. pp. 432-439, XP010562128.

Anand Prabhu Subramanian et al, "Addressing deafness and hidden terminal problem in directional antenna based wireless multi-hop networks", Wireless Networks; the Journal of Mobile Communication, Computation and Information, Kluwer Academic Publishers, Sep. 19, 2008, pp. 1557-1567, XP019832827.

Samsung: "Potential solutions and techniques for NR-U Operation", 3GPP Draft; RI-1802014 NR-U Solutions, 3rd Generation Partnership Project (3GPP), Mobile Competence Centre; 650, Route Des Lucioles ; F-06921 Sophia-Antipolis Cedex ; France, Feb. 16, 2018, XP051397122, 7 pages.

Qiubin Gao et al: "Radio resource management of D2D communication", 2014 IEEE International Conference on Communication Systems, Nov. 1, 2014, pp. 6-10, XP055513496.

Extended European Search Report for EP Patent Application No. 22180167.3, mailed Aug. 10, 2022, 11 pages.

3GPP TSG-RAN2#85, "Resource Selection in Out of Coverage D2D Voice Communication," General Dynamics Broadband UK, R2-140576, Feb. 10-14, 2014, Prague, Czech Republic, 9 pages.

Notice of Reasons for Rejection for Japanese Patent Application No. 2022-102302, mailed Oct. 10, 2023, 6 pages.

* cited by examiner

100

200

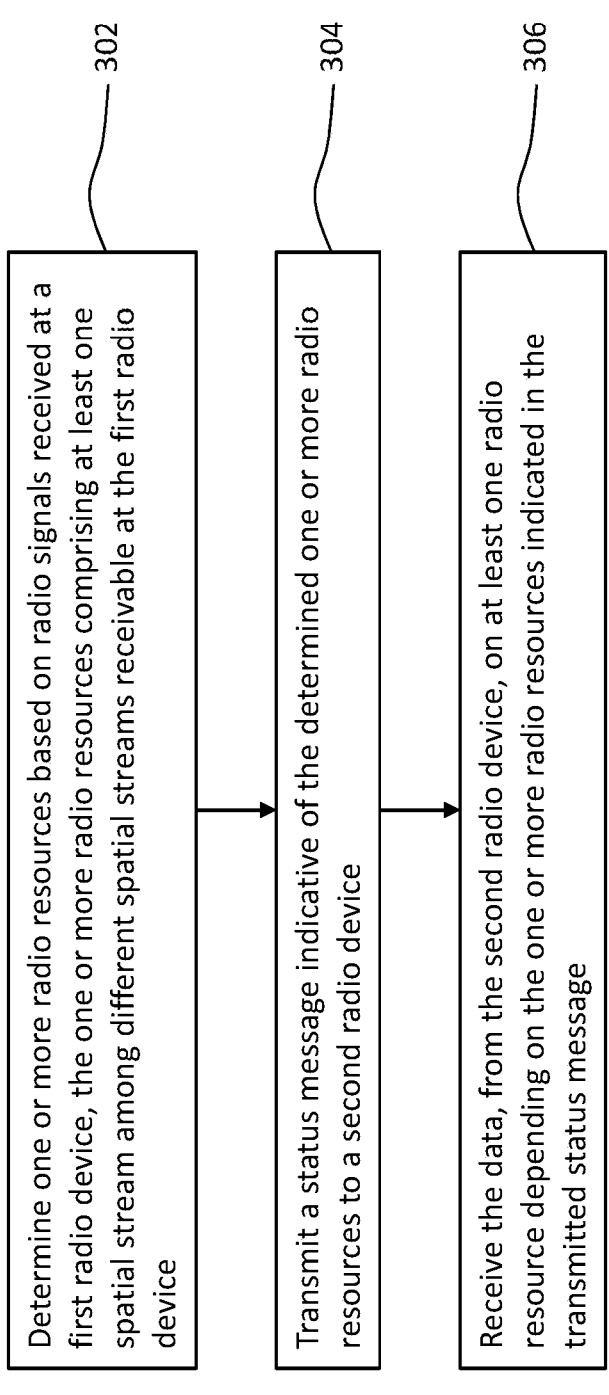

300

Determine one or more radio resources based on radio signals received at a first radio device, the one or more radio resources comprising at least one spatial stream among different spatial streams receivable at the first radio device

302

Transmit a status message indicative of the determined one or more radio resources to a second radio device

304

Receive the data, from the second radio device, on at least one radio resource depending on the one or more radio resources indicated in the transmitted status message

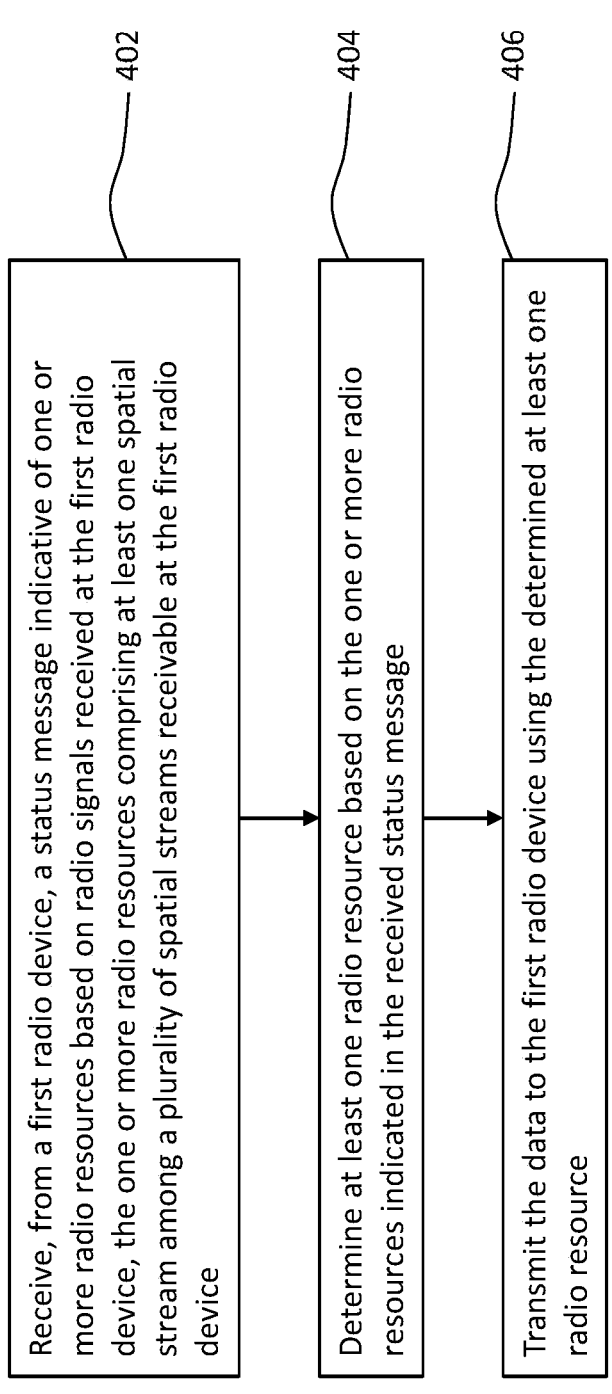

400

Receive, from a first radio device, a status message indicative of one or more radio resources based on radio signals received at the first radio device, the one or more radio resources comprising at least one spatial stream among a plurality of spatial streams receivable at the first radio device ⟶ 402

Determine at least one radio resource based on the one or more radio resources indicated in the received status message ⟶ 404

Transmit the data to the first radio device using the determined at least one radio resource ⟶ 406

TECHNIQUE FOR DEVICE-TO-DEVICE COMMUNICATION BASED ON RADIO SIGNALS RECEIVED FROM ONE OR MORE RADIO SOURCES

CROSS REFERENCE TO RELATED APPLICATIONS

This application is a continuation of U.S. patent application Ser. No. 17/949,148, filed on Sep. 20, 2022, which is a continuation of U.S. patent application Ser. No. 15/775,651, filed on May 11, 2018 (now U.S. Pat. No. 11,483,861 issued on Oct. 25, 2022), which is a 35 U.S.C. § 371 national stage application of PCT International Application No. PCT/EP2018/056683 filed on Mar. 16, 2018, the disclosure and content of which is incorporated by reference herein in its entirety.

TECHNICAL FIELD

The present disclosure relates to device-to-device communication. More specifically, and without limitation, methods and devices are provided for allocating radio resource in a direct communication between radio devices.

BACKGROUND

Radio communication for road traffic can actively avoid accidents and improve traffic efficiency. To this end, vehicle-to-vehicle (V2V), vehicle-to-pedestrian (V2P) and vehicle-to-infrastructure (V2I) communication, collectively referred as vehicle-to-anything (V2X) communication, requires high reliability and low end-to-end (E2E) latency, which is achievable by device-to-device (D2D) communication, i.e., direct communication including packet transmission directly among radio devices participating in the traffic.

The Third Generation Partnership Project (3GPP) has expanded the Long Term Evolution (LTE) platform by building V2X communication upon Proximity-based Services (ProSe, also referred to as LTE D2D) since Release 12 of LTE. The V2X communication, e.g., according to the document 3GPP TS 22.185, version 14.3.0, includes enhancements targeting specific characteristics of vehicular communications such as high velocity (e.g., up to 250 km/h) and high density of radio devices (e.g., thousands of neighboring nodes).

To enhance system level performance under high density while meeting the latency requirements of V2X communication, 3GPP introduced sidelink (SL) transmission modes 3 and 4 (also referred to as resource allocation modes) for V2X communication with and without the infrastructure of a radio access network (RAN) being involved, respectively. The RAN is in charge of allocating radio resources to a transmitting radio device (i.e., centralized scheduling) in mode 3, whereas the transmitting radio device autonomously selects the radio resources for its own transmissions (i.e., distributed scheduling) in mode 4.

Since distributed scheduling requires a transmitting radio device to perform an access mechanism for carrier-sense multiple access (CSMA), distributed scheduling is susceptible to a "hidden node problem" (HNP), which occurs if a transmitting radio device is within range of a receiving radio device and out of range of another transmitting radio device (i.e., the "hidden" node) in radio communication with the receiving radio device. Q. Gao et al. suggest in the document "Radio resource management of D2D communication," IEEE International Conference on Communication Systems, Macau, 2014, pp. 6-10, modifying the access mechanism at the transmitting radio devices to mitigate the HNP.

However, existing access mechanisms rely upon a contention window, which causes a loss of radio resources in the time domain and adds to the latency of the radio communication. Furthermore, existing access mechanisms can still lead to the HNP if the radio communication includes a directional radio transmission directed towards the receiving radio device. Thus, the HNP can occur even if the hidden node is a neighboring node of the transmitting radio device of the radio communication.

SUMMARY

Accordingly, there is a need for a D2D communication technique that avoids or mitigates a hidden node problem for directional radio communications. Alternatively or in addition, there is a need for a D2D communication technique that uses radio resources more efficiently.

As to a first method aspect, a method of receiving data in a radio communication at a first radio device from a second radio device is provided. The method may comprise or initiate a step of determining one or more radio resources based on radio signals received at the first radio device. The one or more radio resources may comprise at least one spatial stream among different spatial streams receivable at the first radio device. The method may further comprise or initiate a step of transmitting a status message indicative of the one or more determined radio resources to the second radio device. The method may further comprise or initiate a step of receiving the data from the second radio device at the first radio device on at least one radio resource depending on the one or more radio resources indicated in the transmitted status message.

The radio communication between the first and second radio devices may be a device-to-device (D2D) communication. The first radio device may also be referred to as a data-receiving radio device. The second radio device may also be referred to as a data-transmitting radio device.

Embodiments enable the data-receiving first radio device to influence, determine and/or control by means of the status message the radio resources and/or parameters of the data transmission from the second radio device to the first radio device. Based on the radio signals received at the first radio device, same or further embodiments can avoid or mitigate a hidden node problem for the radio communication, particularly for a directional radio communication by indicating in the status message the at least one spatial stream.

The first radio device may detect and/or avoid a radio resource collision at the first radio device based on the received radio signals. By transmitted the status message to the second radio device, the at least one radio resource used for the data transmission may be corrected and/or controlled in case of collision detection and/or for collision avoidance.

Alternatively or in addition, embodiments can reduce a latency of the radio communication and/or use radio resources more efficiently, e.g., since the second radio device may rely on the one or more indicated radio resources for the data transmission. More specifically, a contention resolution mechanisms or a contention window may be avoided, e.g., by using the at least one radio resource, that depends on the status message, for the data transmission.

The technique may be implemented as a D2D or direct communication between two or more radio devices. A radio network may comprise the first and second radio devices.

The radio network may be a vehicular network and/or an ad hoc network. The radio network may comprise a plurality of radio devices.

The status message may indicate the one or more radio resource in time (e.g., in terms of slots, subframes or delays), frequency (e.g., in terms of subcarriers) and/or space (e.g., in terms of precoding, coherent combining or spatial streams), or combinations thereof (e.g., in terms of resource blocks for each of the at least one spatial stream).

The radio signals may be received at the first radio device from an interferer, one or more radio devices of the radio network, any radio source other than the first radio device and/or any radio source outside of the radio network. Radio resources determined based on such received radio signals may be indicated in the status message as excluded. Alternatively or in addition, the radio signals may be received at the first radio device from the second radio device, e.g., carrying previously transmitted data or reference signals. Radio resources determined based on such received radio signals may be indicated in the status message as preferred.

At least one of the radio devices, e.g., the first and/or the second radio device, may be configured to exchange the data with or forward the data from or to the Internet and/or a host computer. At least one of the radio devices, e.g., the first and/or the second radio device, may function as a gateway to the Internet and/or the host computer. For example, the data may be sent from the host computer through the second radio device to the first radio device. The data from the host computer may comprise media streams (e.g., video or music), network feeds (e.g., sequences of images and texts), search engine results (e.g., a list of universal resource locators), speech recognition services (an audio stream of a synthesized voice from the host computer responsive to a recorded audio stream sent to the host computer), location-specific information (e.g., objects for rendering an augmented reality) and/or program code (e.g., for mobile applications or "apps").

The first radio device and/or the second radio device may comprise an antenna array. The first radio device may use the antenna array for receiving the radio signal for the determination and/or for receiving the data. The second radio device may use the antenna array for transmitting the data. The radio communication may use a multiple-input multiple-output (MIMO) channel.

The radio communication may be a directional radio communication. The directional radio communication may comprise a directional transmission and/or a directional reception. Examples for the directional radio transmission may include at least one of precoding the antenna array (e.g., for a beamforming transmission) at the transmitting radio device, coherently combining the antenna array (e.g., for a beamforming reception) at the receiving radio device and shadowing (e.g., an obstructed radio propagation) between the transmitting devices.

The first method aspect may be implemented as a method of selecting transmission resources and/or reception resources as the one or more indicated radio resources. The first method aspect may be implemented as a method for the first radio device to suggest or recommend, and/or to decline or disfavor, the determined one or more radio resources and certain transmission parameters to one or more other (e.g., surrounding) second radio devices by means of the status message. Herein, radio resources may encompass certain transmission parameters and/or reception parameters, e.g., a radio propagation direction of a directional gain or a pre-coding matrix for the data transmission from the second radio device and/or a directional gain or combining vectors for the data reception at the first radio device. The transmission parameters and/or the reception parameters may define the at least one spatial stream.

The at least one radio resource depending on the one or more radio resources indicated in the status message may further depend on a result of a channel sensing procedure performed at the second radio device.

The at least one radio resource used for the data transmission from the second radio device, or respectively for the data reception at the first radio device, may depend on the one or more radio resources indicated in the transmitted status message. For example, the one or more radio resources indicated in the status message may comprise the at least one radio resource used for the data communication. The one or more radio resources indicated in the status message may comprise a locally vacant, predetermined and/or preferred radio resource for the data communication. Alternatively or in addition, the at least one radio resource used for the data communication may be different from one, a subset of or all the radio resources indicated in the status message. The one or more radio resources indicated in the status message may comprise a locally occupied, excluded and/or adverse radio resource for the data communication. Herein, "locally" may refer to the location or vicinity of the first radio device. Alternatively or in addition, "locally" may refer to a result of the radio signal reception at the first radio device. For example, the indicated spatial stream may have a maximum ratio of signal to noise and/or interference at the receiving first radio device.

The first radio device may comprise a plurality of antenna ports. Different spatial streams may correspond to combinations of signals from the plurality of antenna ports according to different combining vectors for a beamforming reception at the first radio device.

The signal combinations may comprise coherent combinations of received antenna signals or baseband signals. The signals may be combined by multiplying each of the signals with a component of the applied combining vector corresponding to the antenna port and adding the multiplied signals. Multiplying the components may correspond to phase shifts or complex gains. The combining vectors may be applied (e.g., by means of phase shifters) in an analog domain and/or (e.g., by means of signal processors) in a digital domain of the first radio device. Alternatively or in addition, the different spatial streams may correspond to different directional gains at the first device.

The beamforming reception at the first radio device may be the receiving end of a MIMO channel or a single-input multiple-output (SIMO) channel for the radio communication from the second radio device to the first radio device.

The status message may be indicative of the at least one spatial stream corresponding to a beamforming reception at the first radio device by indicating a spatial degree of freedom (DoF) of the beamforming reception at the first radio device.

The status message may be indicative of the at least one spatial stream by indicating a (e.g., maximum or preferred) rank of the radio communication or spatial degree of freedom (DoF) for the reception at the first radio device and/or a readiness for beamforming or directional reception at the first radio device, e.g., in the presence of interference arriving at the first radio device in a direction other than a direction of the data reception and/or in a direction suppressing the interference.

The second radio device may comprise a plurality of antenna ports. Different spatial streams may correspond to different precoding vectors applied to the plurality of antenna ports for beamforming transmissions at the second radio device.

A signal to be transmitted may be split into coherent antenna signals each being multiplied by one component of the applied precoding vector and being transmitted through the corresponding one of the antenna ports. Multiplying the components may correspond to phase shifts or complex gains. The precoding vectors may be applied (e.g., by means of phase shifters) in an analog domain and/or (e.g., by means of signal processors) in a digital domain of the second radio device. Alternatively or in addition, the different spatial streams may correspond to different directional gains at the second device.

The antenna ports at the first radio device and/or the second radio device may correspond to antenna elements of an antenna array at the respective radio device. For example, each antenna port may correspond to a different antenna element or may be coupled to one of disjoint sets of antenna elements.

A multiple-input multiple-output (MIMO) channel between the first radio device and the second radio device may comprise the different spatial streams.

The radio signals received at the first radio device for the determination may comprise radio signals from a radio source other than the second radio device. The one or more determined radio resources may suppress, or may be not interfered by, the radio signals from the other radio source.

The one or more determined radio resources may suppress the radio signals from the other radio source by circumventing the radio signals from the other radio source in time, frequency and/or the spatial stream.

A combining vector of each of the at least one spatial stream comprised in the one or more determined radio resources may be orthogonal to a combining vector corresponding to the radio signals from the other radio source.

The radio signals from the other radio source may be received at a first direction at the first radio device. The spatial stream comprised in the one or more determined radio resources may have a maximum receiver gain in a second direction at the first radio device. The second direction may be different from the first direction. More specifically, the spatial stream comprised in the one or more determined radio resources may correspond to a directional antenna gain that is minimal at the first direction.

The radio signals received at the first radio device for the determination may comprise reference signals or interference. The one or more radio resources may be determined based on a received power of the radio signals measured at the first radio device.

The received power may comprise at least one of a reference signal received power (RSRP), a reference signal strength indicator (RSSI), a noise power level and an interference power level.

The received power of the radio signals from the other radio source may be measured at the first radio device on each of the one or more determined radio resources suppressing or not interfered by the radio signals from the other radio source.

The status message may be indicative of two or more radio resources and a numerical preference or preference level associated with each of the indicated radio resources. The numerical preference or preference level may depend on the received power measured on the corresponding radio resource and/or the interference measured on the corresponding radio resource.

The status message may be indicative of one or more radio resources preferred for the data reception.

The status message may be indicative of the preference level for each of the one or more preferred radio resources.

The status message may be indicative of one or more radio resources preferred for the data reception, if the received power measured on the respective one or more preferred radio resources is less than a predefined threshold value.

The status message may be further indicative of a priority of other data from another radio source to be transmitted on one or more of the preferred radio resources.

The priority of the other data (or a corresponding data packet) may depend on at least one of a type of service underlying the other data, a Quality of Service (QoS) Class Identifier (QCI) for the other data and a destination of the other data. The first radio device may derive the priority from a booking message transmitted from the other radio device. The second radio device may defer its transmission or use another radio resource (e.g., among the indicated radio resources) if a priority of its data to be transmitted is less than the priority indicated in the status message.

The status message may be indicative of one or more radio resources excluded for the data reception.

The preferred radio resources may be associated with a positive preference level. The excluded radio resources may be associated with a negative preference level.

The status message may be indicative of one or more radio resources excluded for the data reception, if the received power measured on the respective one or more excluded radio resources is greater than a predefined threshold value.

The status message may be further indicative of the threshold value, e.g., for preferred radio resources and/or for excluded radio resources, or a common value for both.

The radio signals received at the first radio device for the determination may comprise booking messages (or any other scheduling announcement), which are indicative of scheduled transmissions. The one or more radio resources are determined based on the scheduled transmissions, e.g., by decoding the booking messages at the first radio device.

The scheduled transmission indicated by the booking messages may relate to a future interference at the first radio device. The one or more determined radio resource may circumvent the scheduled transmission in time and/or frequency. The booking messages may be received at the first radio device from radio devices of the radio network other than the second radio device.

The radio signals received at the first radio device for the determination may comprise reference signals from the second radio device. A combining vector of each of the at least one spatial stream (e.g., comprised in the one or more determined radio resources) may correspond to a maximum-ratio combining (MRC) of the radio signals from the second radio device.

The combining vector used for the receiver beamforming at the first radio device may correspond to a combining vector measured for the radio signals received from the second radio device at the first radio device.

Different radio signals received from the second radio device for the determination may be precoded by different precoding vectors. The different precoding vectors may be associated with different signal identifiers encoded in the different radio signals. The status message may be indicative of the at least one spatial stream (that is comprised in the one or more determined radio resources) by including a reference to the corresponding one or more signal identifiers.

The signal identifiers may be encoded in the radio signals from the second radio device using different signal sequences and/or different radio resource patterns, e.g., in time and/or frequency.

The determined and/or indicated one or more radio resources may be a combination of the at least one spatial stream and a constraint in at least one of time domain and frequency domain. For example, each determined and/or indicated radio resource may define a combination of one spatial stream (also: spatial radio resource, e.g., one precoding vector, one combining vector or both), one frequency range (e.g., one or more subcarriers) and one time period (e.g., one or more subframes or slots). The constraint may depend on the radio signals received at the first radio device and/or a receiver capability of the first radio device.

A time division multiplexing (TDM) pattern and/or a frequency division multiplexing (FDM) pattern may be indicative of the constraint in at least one of the time domain and the frequency domain. The pattern indicative of the constraint may be transmitted in the status message that is also indicative of the at least one spatial stream (e.g., in two bit fields, respectively) or in a separate status message.

The radio communication may comprise a half-duplex communication link between the first radio device and the second radio device. The first radio device may exclude a time resource from the one or more indicated radio resources for a transmission from the first radio device to the second radio device.

The radio network may comprise a plurality of embodiments of the first radio device and/or a plurality of embodiments of the second radio device. Different status messages indicative of different spatial streams may be transmitted to different second radio devices.

The first radio device may be capable of simultaneously receiving a maximum number of independent radio signals. The determination of the one or more radio resources may include determining available radio resources based on the received radio signals, and selecting a subset of the available radio resources fulfilling the maximum number of simultaneously receivable radio signals.

The status message may be transmitted on a Physical Sidelink Control Channel (PSCCH) and/or using Sidelink Control Information (SCI). The status message may comprise one or more bit fields indicative of the one or more determined radio resources.

The status message may be transmitted in at least one of an information field of the SCI, a physical sidelink data channel, a Physical Sidelink Shared Channel (PSSCH), a special or dedicated physical channel that is specifically designed for transmitting the status message. Alternatively or in addition, the status message, or a copy thereof, may be transmitted on an uplink physical channel to a base station.

The method may further comprise or initiate a step of transmitting user data from the first radio device to the second radio device. The status message and the user data may be included in the same data packet transmitted from the first radio device to the second radio device.

The status message may be at least one of periodically transmitted and transmitted upon request (e.g., from the second radio device).

The status message may be transmitted in at least one of a unicast mode, a multicast mode and a broadcast mode. For example, the status message may be broadcasted periodically. Alternatively or in addition, the status message may be transmitted in the unicast mode to the second radio device responsive to the request received from the second radio device.

The transmission of the status message may be triggered by a change in the one or more determined radio resources, e.g., as compared to one or more radio resources previously indicated to the second radio device.

The radio signals for the determination of the one or more radio resources may be received in a channel sensing procedure at the first radio device. The status message may be further indicative of a capability of performing the channel sensing process at the first radio device.

The status message may be indicative of a scope of the channel sensing procedure performed by the first radio device, e.g., whether full sensing or partial sensing is performed. The full sensing and the partial sensing may be different in terms of a time duration (e.g., sensing window) and/or a radio bandwidth of the channel sensing.

As to a second method aspect, a method of transmitting data in a radio communication from a second radio device to a first radio device is provided. The method may comprise or initiate a step of receiving, from the first radio device, a status message indicative of one or more radio resources based on radio signals received at the first radio device. The one or more radio resources may comprise at least one spatial stream among different spatial streams receivable at the first radio device. The method may further comprise or initiate a step of determining at least one radio resource based on the one or more radio resources indicated in the received status message. The method may further comprise or initiate a step of transmitting the data to the first radio device using the determined at least one radio resource.

The second method aspect may be implemented as a method for the second radio device to take the one or more radio resources indicated in the status message into account when determining (e.g., selecting) the at least one radio resource for the data transmission. The received status message may suggest or recommend, and/or decline or disfavor, one or more of the indicated radio resources. Optionally, the second radio device may combine the suggestions indicated in the status message with results of an own local sensing procedure (briefly: channel sensing), e.g., during or part of a radio resource selection process (briefly: sensing-based radio resource selection), at the second radio device for the data transmission.

The second radio device may receive multiple status messages, e.g., from multiple first radio devices as (e.g., addressed or potential) receivers of the data transmission. In other words, the second radio device may capture multiple suggestions. The second radio device may combine the multiple suggestions with the results of its own local sensing procedure to determine the at least one radio resource.

The at least one radio resource may relate to the time of the data transmission (e.g., one or more slots or subframes used for the transmission), the frequency of the data transmission (e.g., one or more subcarriers used for the transmission) and/or the spatial stream used for the data transmission. For example, the step of determining the at least one radio resource may comprise determining whether to transmit or to delay the transmission and/or to decide on the transmission resources and/or transmission parameters.

The method may further comprise or initiate a step of determining one or more radio resources based on radio signals received at the second radio device. The determination of the at least one radio resource used for the transmission may depend on a combination of the radio resources indicated by the first radio device and the radio resources determined by the second radio device.

The determination of the one or more radio resources based on radio signals received at the second radio device may be part of a channel sensing procedure (also: local sensing), particularly a sensing-based radio resource allocation, performed by the second radio device. The at least one radio resource may be determined based on the one or more radio resources indicated in the status message and further based on a result of the local sensing, i.e. the combination of the radio resources indicated by the first radio device and the radio resources determined by the second radio device.

The status message may further be indicative of a priority of other data to be transmitted on one or more of the (e.g., preferred) radio resources indicated in the status message. The determination of the at least one radio resource used for the transmission of the data may depend on a comparison of a priority associated with the data transmitted by the second radio device and the priority indicated in the status message. The data may be transmitted if (e.g., only if) the associated priority is higher than the indicated priority.

The determination of the at least one radio resource for the data transmission may be based on the one or more radio resources indicated in the status message if (e.g., only if) a time gap between the reception of the status message and the data transmission is less than a predefined threshold value. For example, the status message or each indicated radio resource may be associated with an expiry time.

Such status messages may be received from multiple of such first radio devices. The determination of the at least one radio resource used for the transmission may depend on a combination of the radio resources indicated by the multiple first radio devices.

Alternatively or in addition, such status messages may be received from multiple first radio devices of a mesh radio network. The method may further comprise or initiate a step of selecting the first radio device for the transmission of the data among the multiple first radio devices based on the status messages. The radio communication from the second radio device to the selected first radio device may provide a hop in a multi-hop radio communication of the data.

Alternatively or in addition, such status messages are received from multiple first radio devices (e.g., being intended receivers of the data). The determination may comprises determining a transmission mode among a unicasting mode and a multicasting mode for the data transmission depending on an overlap of preferred radio sources indicated by the status messages. For example, the determination may comprises deriving a precoding vector from the spatial streams indicated by the multiple first radio devices for the transmission in the unicast mode.

The second method aspect may further comprise any feature, or may comprise or initiate any step, disclosed in the context of the first method aspect or a feature or step corresponding thereto. Moreover, the first method aspect may be performed at or by the first radio device. Alternatively or in combination, the second method aspect may be performed at or by the second radio device. The first radio device and second radio device may be spaced apart. The first radio device and second radio device may be in data or signal communication exclusively by means of the radio communication.

In any aspect, the first radio device and the second radio device may form, or may be part of, a radio network. The radio network may be a vehicular, ad hoc and/or mesh network, e.g., according to the Third Generation Partnership Project (3GPP) or according to the standard family IEEE 802.11 (Wi-Fi). The first method aspect may be performed by one or more embodiments of the first radio device in the radio network. The second method aspect may be performed by one or more embodiments of the second radio device in the radio network.

Any of the first and second radio devices may be a mobile or wireless radio device, e.g., a 3GPP user equipment (UE) or a Wi-Fi station (STA). The first radio device and/or the second radio device may be mobile or portable station, a device for machine-type communication (MTC), a device for narrowband Internet of Things (NB-IoT) or a combination thereof. Examples for the UE and the mobile station include a mobile phone, a tablet computer and a self-driving vehicle. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in a manufacturing plant, household appliances and consumer electronics.

Any of the radio devices may be wirelessly connected or connectable (e.g., according to a radio resource control, RRC, state or active mode) with a base station, also referred to as transmission and reception point (TRP), radio access node or access point (AP). A radio access network (RAN) may comprise one or more of the base stations. Herein, the base station may encompass any station that is configured to provide radio access to any of the first and second radio devices. Alternatively or in addition, at least one of the radio devices may function as a gateway between the radio network and the RAN and/or the Internet, particularly for a data link to the host computer providing the data. Examples for the base stations may include a 3G base station or Node B, 4G base station or eNodeB, a 5G base station or gNodeB, a Wi-Fi AP and a network controller (e.g., according to Bluetooth, ZigBee or Z-Wave).

The RAN may be implemented according to the Global System for Mobile Communications (GSM), the Universal Mobile Telecommunications System (UMTS), 3GPP Long Term Evolution (LTE) and/or 3GPP New Radio (NR).

Any embodiment of the first and second radio devices may selectively perform the corresponding method aspect in a mode for autonomous resources selection or distributed scheduling, e.g., if the first radio device and/or the second radio device of the radio communication is out of coverage of the RAN.

The radio communication may be a D2D sidelink (SL, e.g., a 3GPP D2D SL) with distributed scheduling and/or according to 3GPP SL transmission mode 4. The technique may be compatible with or extend at least one of the document 3GPP TS 24.386, e.g., version 14.3.0; the document 3GPP TS 23.303, e.g., version 14.1.0; the document 3GPP TS 23.285, e.g., version 14.5.0; and the document 3GPP TS 22.185, e.g., version 14.3.0.

Any aspect of the technique may be implemented on a Physical Layer (PHY), a Medium Access Control (MAC) layer, a Radio Link Control (RLC) layer and/or a Radio Resource Control (RRC) layer of a protocol stack for the radio communication.

As to another aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download via the radio network, the RAN, the Internet and/or the host computer. Alternatively or in addition, the method may be encoded in a Field-Programmable Gate Array (FPGA) and/or an Application-Specific Integrated Circuit (ASIC), or the functionality may be provided for download by means of a hardware description language.

As to a first device aspect, a first radio device for receiving data in a radio communication at the first radio device from a second radio device is provided. The first radio device may be configured to perform any one of the steps of the first method aspect. Alternatively or in addition, the first radio device may comprise a determining unit configured to determine one or more radio resources based on radio signals received at the first radio device, the one or more radio resources comprising at least one spatial stream among different spatial streams receivable at the first radio device. Alternatively or in addition, the first radio device may comprise a transmitting unit configured to transmit a status message indicative of the one or more determined radio resources to the second radio device. Alternatively or in addition, the first radio device may comprise a receiving unit configured to receive the data from the second radio device at the first radio device on at least one radio resource depending on the one or more radio resources indicated in the transmitted status message.

As to a second device aspect, a second radio device for transmitting data in a radio communication from the second radio device to a first radio device is provided. The second radio device may be configured to perform any one of the steps of the second method aspect. Alternatively or in addition, the second radio device may comprise a receiving unit configured to receive, from the first radio device, a status message indicative of one or more radio resources based on radio signals received at the first radio device, the one or more radio resources comprising at least one spatial stream among different spatial streams receivable at the first radio device. Alternatively or in addition, the second radio device may comprise a determining unit configured to determine at least one radio resource based on the one or more radio resources indicated in the received status message. Alternatively or in addition, the second radio device may comprise a transmitting unit configured to transmit the data to the first radio device using the determined at least one radio resource.

As to a further first device aspect, a first radio device for receiving data in a radio communication at the first radio device from a second radio device is provided. The first radio device comprises at least one processor and a memory. Said memory may comprise instructions executable by said at least one processor whereby the first radio device is operative to determine one or more radio resources based on radio signals received at the first radio device, the one or more radio resources comprising at least one spatial stream among different spatial streams receivable at the first radio device. Execution of the instructions may further cause the first radio device to be operative to transmit a status message indicative of the one or more determined radio resources to the second radio device. Execution of the instructions may further cause the first radio device to be operative to receive the data from the second radio device at the first radio device on at least one radio resource depending on the one or more radio resources indicated in the transmitted status message.

As to a further second device aspect, a second radio device for transmitting data in a radio communication from the second radio device to a first radio device is provided. The second radio device comprises at least one processor and a memory. Said memory may comprise instructions executable by said at least one processor whereby the second radio device is operative to receive, from the first radio device, a status message indicative of one or more radio resources based on radio signals received at the first radio device, the one or more radio resources comprising at least one spatial stream among different spatial streams receivable at the first radio device. Execution of the instructions may further cause the second radio device to be operative to determine at least one radio resource based on the one or more radio resources indicated in the received status message. Execution of the instructions may further cause the second radio device to be operative to transmit the data to the first radio device using the determined at least one radio resource.

As to a still further aspect a communication system including a host computer is provided. The host computer may comprise a processing circuitry configured to provide user data, e.g., depending on the location of the UE determined in the locating step. The host computer may further comprise a communication interface configured to forward user data to a cellular network for transmission to a user equipment (UE), wherein the UE comprises a radio interface and processing circuitry, a processing circuitry of the cellular network being configured to execute any one of the steps of the first and/or second method aspect.

The communication system may further include the UE. Alternatively or in addition, the cellular network may further include one or more base stations and/or gateways configured to communicate with the UE and/or to provide a data link between the UE and the host computer using the first method aspect and/or the second method aspect.

The processing circuitry of the host computer may be configured to execute a host application, thereby providing the user data and/or any host computer functionality described herein. Alternatively or in addition, the processing circuitry of the UE may be configured to execute a client application associated with the host application.

The first and second radio devices (e.g., the UE), the base station, the system or any node or station for embodying the technique may further include any feature disclosed in the context of the method aspects, and vice versa. Particularly, any one of the units and modules, or a dedicated unit or module, may be configured to perform or initiate one or more of the steps of the method aspect.

BRIEF DESCRIPTION OF THE DRAWINGS

Further details of embodiments of the technique are described with reference to the enclosed drawings, wherein:

FIG. 3 shows a flowchart for a method of receiving data in a radio communication at a first radio device from a second radio device, which method may be implementable by the first radio device of FIG. 1;

FIG. 4 shows a flowchart for a method of transmitting data in a radio communication from a second radio device to a first radio device, which method may be implementable by the second radio device of FIG. 2;

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented for any other radio communication technique, including 3GPP LTE (e.g., LTE-Advanced or a related radio access technique such as MulteFire), in a Wireless Local Area Network (WLAN) according to the standard family IEEE 802.11, for Bluetooth according to the Bluetooth Special Interest Group (SIG), particularly Bluetooth Low Energy, Bluetooth Mesh Networking and Bluetooth broadcasting, for Z-Wave according to the Z-Wave Alliance or for ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Furthermore, embodiments described herein are combinable, e.g., in parts or completely. For example, features indicated by like reference signs may correspond to equivalent or alternative implementations of said features and may be individually exchangeable between the embodiments described herein. While embodiments of the technique are described in the context of V2X communications, such embodiments are readily applicable to any other direct communication between radio devices, e.g., in other scenarios involving D2D communications.

Figure 1:
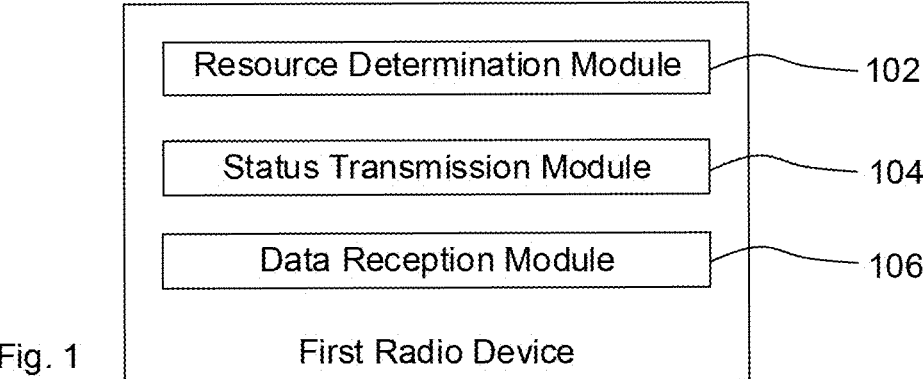
FIG. 1 shows a schematic block diagram of a first radio device for receiving data in a radio communication at the first radio device from a second radio device.

FIG. 1 schematically illustrates a block diagram of a first radio device for receiving data from a second radio device. The first radio device is generically referred to by reference sign 100.

The first radio device 100 may briefly be referred to as receiving device or receiver. The second radio device may briefly be referred to as transmitting device or transmitter. The receiving device 100 and the transmitting device are in a radio communication at least for the data reception at the receiving device 100.

The receiving device 100 comprises a resource determination module 102 that determines one or more radio resources based on radio signals received at the receiving device 100. The one or more determined radio resources comprise at least one spatial stream among a plurality of spatial streams receivable at the receiving device 100. The receiving device 100 further comprises a status transmission module 104 that transmits a status message indicative of the one or more determined radio resources to the transmitting device. The receiving device 100 further comprises a data reception module 106 that receives the data from the transmitting device on at least one radio resource that depends on the one or more radio resources indicated in the transmitted status message.

Any of the modules of the receiving device 100 may be implemented by units configured to provide the corresponding functionality.

Figure 2:
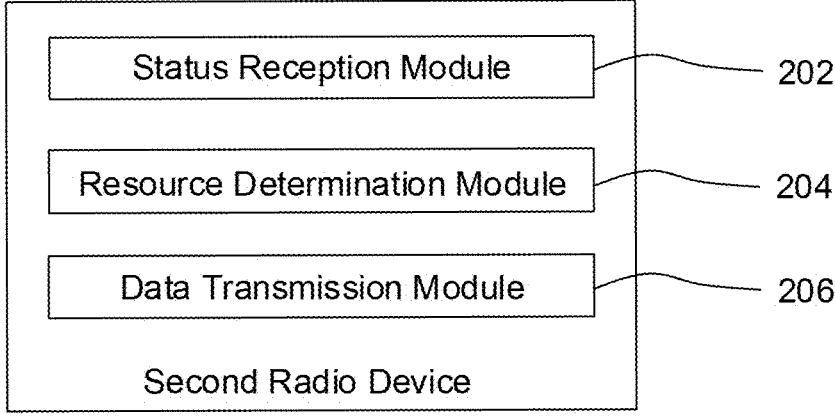
FIG. 2 shows a schematic block diagram of a second radio device for transmitting data in a radio communication from the second radio device to a first radio device.

FIG. 2 schematically illustrates a block diagram of a second radio device for transmitting data to a first radio device. The second radio device is generically referred to by reference sign 200.

The first radio device may briefly be referred to as receiving device or receiver. The second radio device 200 may briefly be referred to as transmitting device or transmitter. The receiving device and the transmitting device 200 are in a radio communication at least for the data transmission from the transmitting device 200.

The transmitting device 200 comprises a status reception module 202 that receives, from the receiving device, a status message indicative of one or more radio resources based on radio signals received at the receiving device. The one or more indicated radio resources comprise at least one spatial stream among a plurality of spatial streams receivable at the receiving device. The transmitting device 200 further comprises a resource determination module 204 that determines at least one radio resource based on the one or more radio resources indicated in the received status message. The transmitting device 200 further comprises a data transmission module 206 that transmits the data to the receiving device using the determined at least one radio resource.

Any of the modules of the device 200 may be implemented by units configured to provide the corresponding functionality.

Embodiments of the receiving device 100 and/or transmitting device 200 may select transmission resources and/or certain transmission parameters to be used for the radio communications. One aspect of the technique enables the receiving device 100 to suggest transmission resources and/or transmission parameters to other radio devices by means of the status message, e.g., using results of its own sensing-based radio resource selection. Another aspect of the technique enables the transmitting device 200 to select transmission resources and/or transmission parameters by taking the suggestions from other radio devices into account, e.g., within its own sensing-based radio resource selection.

FIG. 3 shows a flowchart for a method 300 of receiving data in a radio communication from a transmitting device at a receiving device. The method 300 comprises or initiates a step 302 of determining one or more radio resources based on radio signals received at the receiving device. The one or more radio resources comprise at least one spatial stream among different spatial streams receivable at the receiving device. The method 300 further comprises or initiates a step 304 of transmitting, to the transmitting device, a status message that is indicative of the one or more determined radio resources. Moreover, the method 300 further comprises or initiates a step 306 of receiving the data from the transmitting device on at least one radio resource. The at least one radio resource depends on the one or more radio resources indicated in the transmitted status message.

The method 300 may be performed by the receiving device 100. For example, the modules 102, 104 and 106 may perform the steps 302, 304 and 306, respectively.

FIG. 4 shows a flowchart for a method 400 of transmitting data in a radio communication from a transmitting device to a receiving device. The method 400 comprises or initiates a step 402 of receiving, from the receiving device, a status message indicative of one or more radio resources based on radio signals received at the receiving device, the one or more radio resources comprising at least one spatial stream among a plurality of spatial streams receivable at the receiving device. The method 400 further comprises or initiates a step 404 of determining at least one radio resource based on the one or more radio resources indicated in the received status message. Moreover, the method 400 further comprises or initiates a step 406 of transmitting the data to the receiving device using the determined at least one radio resource.

The method 400 may be performed by the transmitting device 200. For example, the modules 202, 204 and 206 may perform the steps 402, 404 and 406, respectively.

Herein, any radio device, e.g., the receiving device 100 and/or the transmitting device 200, may be a mobile or portable station or a radio device wirelessly connectable to the RAN or another radio device. Any radio device may be a user equipment (UE), a device for machine-type communication (MTC) and/or a device for (e.g., narrowband) Internet of Things (IoT).

The technique may be applied to any direct communications between UEs. The methods 300 or 400 may be performed by UEs for selecting transmission resources and/or reception resources, e.g., including transmission and/or reception parameters.

The method 300 may be implemented by the receiving UE 100 that suggests or recommends in the step 304 transmission and/or reception resources and, optionally, certain transmission and/or reception parameters in the status message to other (e.g., surrounding) UEs, e.g., including the transmitting UE 200.

The method 400 may be implemented by the transmitting UE 200 that takes the radio resource suggestions indicated in the received status message into account (and, optionally, combines the received suggestions with results of its own local sensing procedure) during its radio resource selection process 404. Moreover, the transmitting UE 200 capturing multiple suggestions (e.g., multiple status messages from different UEs 100) may combine the multiple suggestions with the outcome of its own local sensing procedure to determine whether to transmit or to delay the transmission and/or to decide on the transmission resources and parameters.

Figure 5:
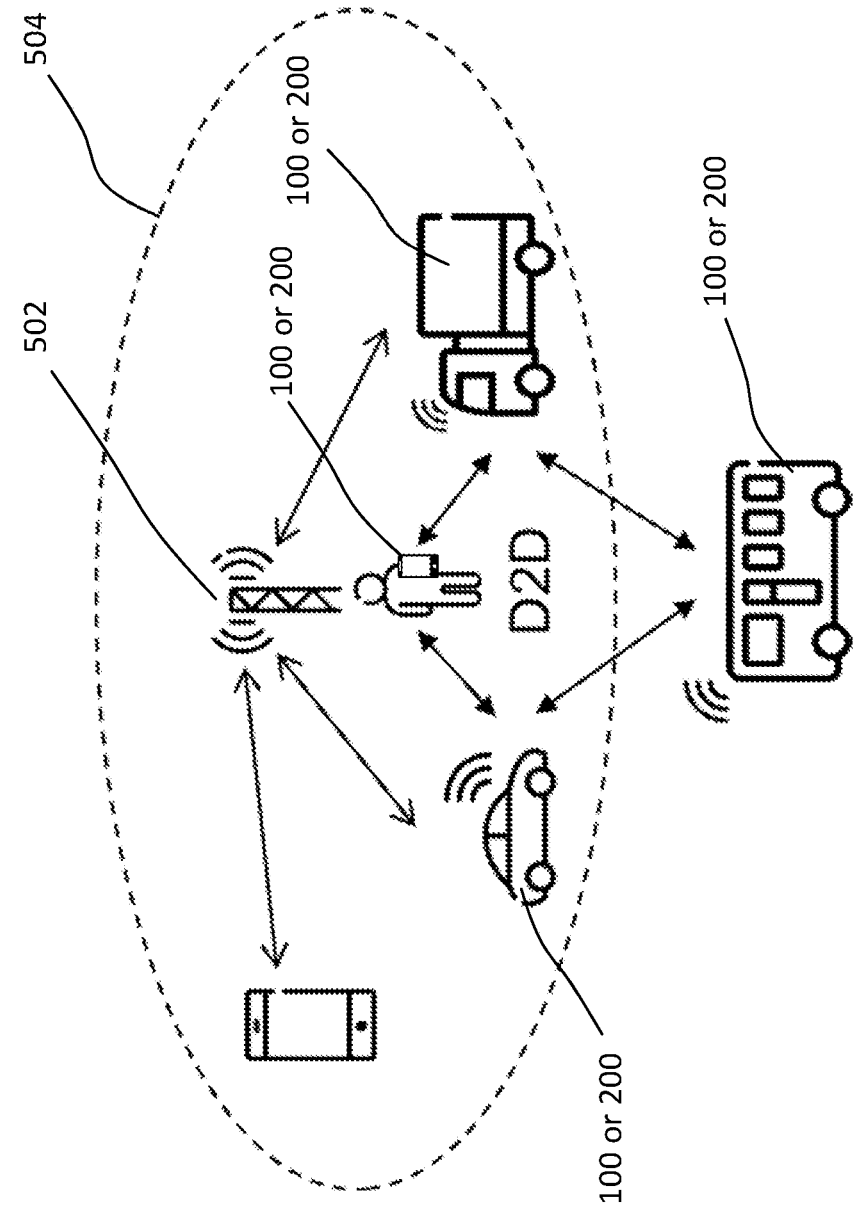
FIG. 5 schematically illustrates an exemplary environment comprising embodiments of the radio devices of FIGS. 1 and 2.

FIG. 5 is a descriptive illustration of an embodiment of a radio network 500, e.g., an LTE implementation, comprising embodiments of the radio devices 100 and/or 200. The embodiment of the radio network 500 comprises a V2X scenario. The embodiments of the radio devices 100 and 200 are configured for vehicular communication including direct V2V functionalities. Optionally, the radio devices 100 and 200 are further configured for V2X communication, including V2P or V2I functionalities.

In V2V communications, the transmitting radio device 200 and the receiving device 100 are mounted on a vehicle or integrated into a vehicle. An embodiment of the receiving device 100 or the transmitting device 200 mounted or integrated on/into a vehicle may also be referred to as vehicle UE (or V-UE for short). V2P communication involves V-UEs and pedestrian UEs (or P-UEs for short) as embodiments of the radio devices 100 and 200. Examples of the P-UEs include handheld devices and wearable devices.

P-UEs and V-UEs may have different sets of requirements and constraints. For example, P-UEs are subject to energy constraints, whereas V-UEs are powered by a vehicle engine or a traction energy storage (e.g., a high-voltage battery) and, thus, have no power supply constraints for its radio chain or signal processing. This implies that V-UEs and P-UEs have different capabilities to handle V2X communications. For example, V-UEs are advanced radio devices compared to P-UEs which may have limited capabilities. Moreover, P-UEs may further comprise different categories, e.g., P-UEs with SL Rx/Tx (Sidelink Reception or Transmission) capabilities and P-UEs without SL Rx/Tx capabilities. The receiving device 100 may be embodied by a P-UE with SL Rx/Tx capabilities.

The radio network 500 may comprise areas of RAN coverage. For example, the radio network 500 comprises a stationary RAN including at least one base station 502. Each base station 502 serves at least one cell 504. The base station 502 may be an evolved Node B (eNodeB or eNB) or a Next Generation Node B (gNodeB or gNB).

V2X operation is possible with and without RAN coverage and with varying degrees of direct interaction between the radio devices 100 and 200 and/or the RAN. Outside of the RAN coverage, the radio devices 100 and 200 may perform the methods 300 and 400, respectively, in a standalone or RAN-less operation. The methods 300 and 400 may be selectively performed, if the radio devices 100 and/or 200 are out of a cell 504 served by a base station 502. However, methods 300 and 400 may be also performed when the radio devices 100 and/or 200 are inside a cell 504 served by a base station 502.

For D2D communication with RAN coverage, e.g., according to 3GPP SL transmission mode 3, the RAN is in charge of allocating the radio resource. For D2D communication without RAN coverage, e.g., according to 3GPP SL transmission mode 4, the transmitting device 200 autonomously selects the radio resources for its own transmissions 406.

The technique may be implemented using features of 3GPP SL transmission mode 4. I.e., the radio communication between the radio devices 100 and 200 may use 3GPP SL transmission mode 4 for the D2D communication. In 3GPP SL transmission mode 4, distributed selection of radio resources is employed. There is no central node for scheduling and radio devices play the same role in autonomous resource selection.

V2X communications according to 3GPP New Radio (NR) and/or future releases of 3GPP LTE support not only broadcast services. For example, unicast and multicast V2X transmissions are important for some enhanced V2X (eV2X) use cases, e.g., platooning, see-through and cooperative maneuver.

For unicast and multicast transmissions, a directional radio communication is beneficial to improve the data transmission from a source radio device to the at least one target radio device. For example, a directional transmission from the transmitting device 200 may improve the data reception at the target radio device, e.g., at least one embodiment of the receiving device 100 as a target of the data transmission. Furthermore, a directional reception at the receiving device 100 may improve the data reception. Alternatively or in addition, a directional transmission from the transmitting device 200 may reduce the interference at other radio devices that are not target radio devices of the data transmission. Furthermore, a directional reception at the receiving device 100 may reduce the interference caused by other transmissions not targeting the receiving device 100.

The directional communication may comprise a directional transmission and/or a directional reception. The directional transmission may be implemented using an antenna array or any other multi-antenna configuration at the transmitting device 200. The directional reception may be implemented using an antenna array or any other multi-antenna configuration at the receiving device 100.

3GPP SL transmission mode 4 comprises two functionalities, namely semi-persistent transmission and sensing-based allocation (also: selection) of radio resources. At least one of the two functionalities may be combined with the methods 300 and/or 400. For example, the determination 404 may be based on a combination of both the channel sensing at the transmitting device 200 and the one or more radio resource indicated in the status message received from the receiving device 100.

To implement the sensing-based allocation of radio resources, the transmitting device 200 may sense a channel (e.g., a radio resource indicated as preferred in the status message) for some time duration (e.g., during a sensing window) preceding a trigger to select or reselect trigger to the at least one radio resource according to the step 404. The channel sensing may comprise measuring energy on the channel and/or decoding a booking message on the channel. For example, the transmitting device 200 may gather booking messages from other radio devices (e.g., other embodiments of the transmitting device 200) in the radio network 500.

The longer the sensing window for receiving as many booking messages as possible or necessary, the better the performance (e.g., to successfully detect or avoid a collision based on observations at the transmitting device 200). The size of the sensing window may be sufficiently long to (e.g., roughly) cover the longest possible booking message, which is referred to as full-sensing procedure. Since long sensing windows may require more energy consumption for the channel sensing (e.g., the receiving of booking messages) and/or since long sensing windows may require the transmitting device 200 to perform complex operations quickly (e.g., the decoding of booking messages), the channel sensing may be avoided and/or the length of the sensing window may be constrained for some types of transmitting devices 200 (e.g., P-UEs) that are subject to restrictions in terms of capabilities and/or energy.

For embodiments of the transmitting device 200 with limited capabilities, the sensing-based allocation of radio resources may be implemented using a partial-sensing procedure and/or a random resource selection. In the partial-sensing procedure, the transmitting device 200 may sense only a (proper) subset of the radio resources within the sensing window of the full-sensing procedure, e.g., only a (proper) subset of the one or more radio resources indicated in the status message. In random resource selection, the at least one radio resource may be selected (i.e., determined in the step 404) by the transmitting device 200 in a random manner, i.e. no channel sensing is used. For example, the at least one radio resource may be randomly selected in step 404 among the one or more radio resources indicate in the status message 604. Herein, the complexity involved in partial-sensing may be reduced relative to the full-sensing in the time domain (e.g., using a shorter sensing window), in the frequency domain (e.g., using less bandwidth), in the spatial domain (e.g., using less antenna elements) or a combination thereof.

Alternatively or in addition to the channel sensing (e.g., during the sensing-based allocation in the step 404), each embodiment of the transmitting device 200 may optionally perform the step 406 as a semi-persistent transmission. The semi-persistent transmission comprises transmitting a notification message from the transmitting device 200. The notification message is transmitted to the receiving device 100 or broadcasted to all radio devices (e.g., in range of the data transmission 406) of the radio network 500.

The notification message notifies the radio devices (e.g., other embodiments of the receiving device 100 receiving, e.g., in the step 302, the notification message) about the intention of the transmitting device 200 to transmit using the at least one radio resource at a later point in time according to the step 406. The at least one radio resource may be specified in time, frequency and/or space. For example, the frequency and/or the space (i.e., the direction of the transmission, e.g., a precoding vector) used for the transmission 406 of the data may correspond to the frequency and/or the space used for the transmission of the notification message. For example, a transmitting device 200 transmitting the notification message at time T may inform the receivers of the notification message that the transmitting device 200 will transmit using the same frequency resources at time T+100 ms. The transmission of the notification message may also be referred to as resource reservation or resource booking. The notification message may also be referred to as the booking message. The resource booking may be beneficial for vehicular applications (e.g., those targeted by 3GPP LTE Release 14), which rely on a periodic transmission of packets.

Semi-persistent transmission, e.g., the reception of the booking message as an example of the radio signals received according to the step 302, allows a radio device, e.g., an embodiment of the receiving device 100, to predict the utilization of the radio resources in the future. That is, by listening to the current transmissions of another radio device (e.g., an embodiment of the transmitting device 200 and possibly but not necessarily the one that is in radio communication with the receiving device 100 receiving the booking message), the receiving device 100 obtains information about potential future transmissions. This information can be used by the receiving device 100 to avoid collisions when selecting its own resources and/or for the determination 302 of the one or more indicated radio resources.

For example, the receiving device 100 predicts the future utilization of the one or more radio resources by decoding (i.e., reading) the received one or more booking messages. Based on the one or more booking messages, the receiving device 100 may schedule its current transmission (e.g., a response to the data reception 306) and/or determine the one or more indicated radio resources in the step 302 to avoid using the same radio resources used by the radio device that is transmitting the book message. This may also be referred to as sensing-based radio resource selection.

Any embodiment of the receiving device 100 and/or the transmitting device 200 may implement the sensing-based resource selection, e.g., in the steps 302 and 404, respectively. The sensing-based resource selection may be implemented according to 3GPP Release 14 or later, e.g., Section 14.1.1.6 in the document 3GPP TS 36.213, Version 14.5.0.

Alternatively or in addition, an exemplary implementation of the sensing-based radio resource selection may comprise at least one of the following sensing steps. In a first sensing step, all radio resources (e.g., all radio resources receivable at the corresponding radio device) are considered available. In a second sensing step, the radio device 100 and/or 200 excludes radio resources based on channel sensing. The channel sensing may comprise at least one of decoding a scheduling assignment (SA) for the respective radio resource, e.g., from a base station 502 if within a cell 504 and/or one or more booking messages, sensing (or measuring) energy on the respective radio resource and optionally additional conditions. A radio resource is excluded if it is indicated or reserved by a decoded SA. Alternatively or in addition, a radio resource is excluded if its energy or power is greater than a predefined threshold value. For example, a radio resource is excluded if its reference signal received power (RSRP) measured on the physical (PHY) Sidelink Shared Channel (PSSCH) in the associated radio resources is above a predefined threshold value. In a third sensing step, the radio device measures and ranks the remaining PSSCH resources based on a measurement of a Received Signal Strength Indication (RSSI) and selects a subset. The subset is the set of candidate radio resources with the lowest total received energy. The size of the subset is, e.g., 20%, of the total resources within the selection window. The resulting at least one radio resource is used for the step 406 by the transmitting device 200 or the resulting one or more radio resources are indicated according to the step 304 by the receiving device 100.

An advantage achievable by embodiments of the technique is described with reference to FIGS. 6A and 6B.

Figure 6A:
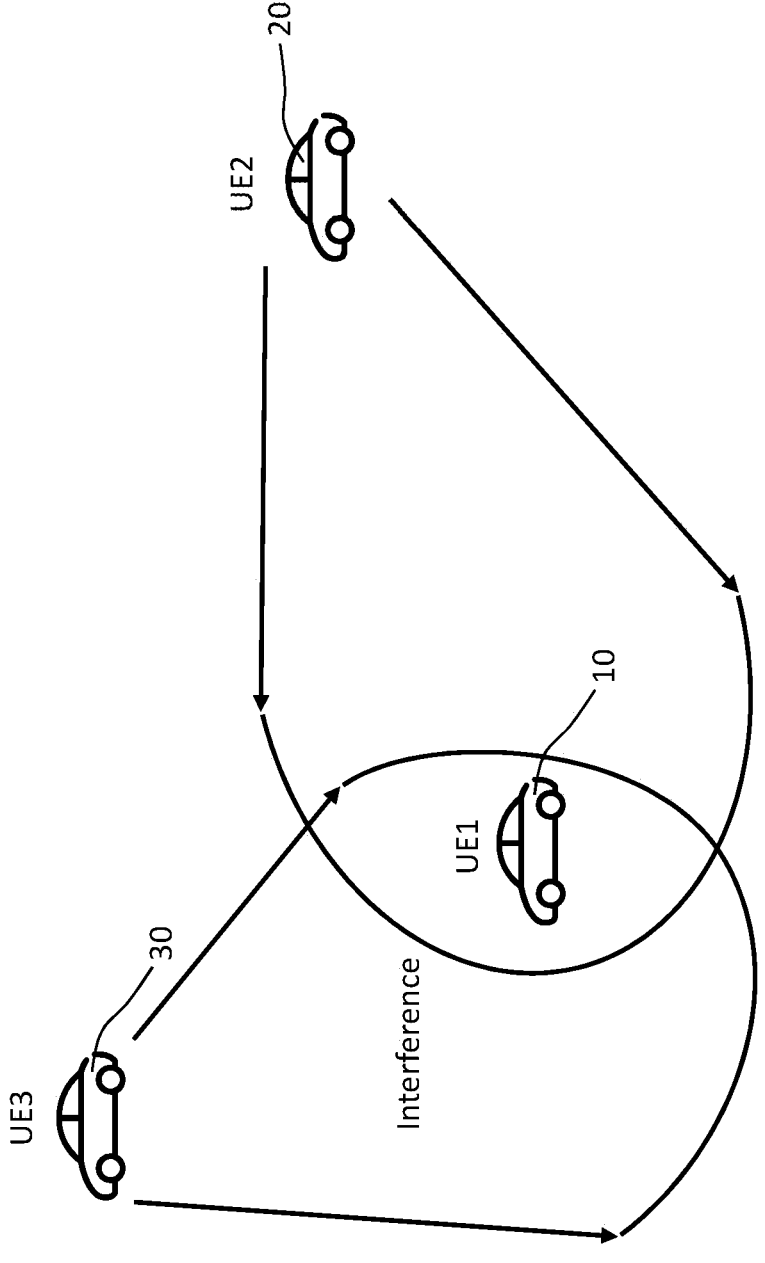
FIG. 6A schematically illustrates a comparative example of a radio environment comprising radio devices in a directional radio communication susceptible to a hidden node problem.

FIG. 6A schematically illustrates a comparative example of a radio environment including conventional radio devices 10, 20 and 30, e.g., existing V-UEs. In conventional autonomous resource selection, e.g., a resource allocation scheme for mode-4 UEs according to 3GPP LTE Release 14 for V2X, a resource is selected by the transmitting UE based on its own sensing outcome. This mechanism works well for SL broadcast, e.g., as specified for 3GPP LTE. However, if one or more of the conventional UEs use directional communications, e.g., in the case of a directional transmission, the conventional autonomous resource selection may not be appropriate, as it can lead to the wrong resource being chosen by the transmitting UE. A collision may be caused by currently existing autonomous resource selection schemes.

With directional transmission, the conventional autonomous resource selection scheme may not work well, i.e., the resource selected by the transmitting device may not be appropriate for signal reception at the receiving device. An example of the collision is schematically illustrated in FIG. 6A. In this example, the radio device 30 intends to use resource X, i.e., a set of radio blocks (RBs) in the time-frequency domain, for its transmission and notifies other UEs of the resource reservation through SA (e.g., by transmitting a corresponding booking message). However, the device 20 is out of the communication range of the device 30 and, thus, is unaware of the notification. As a consequence, it is possible that the device 20 also selects resource X based on its sensing outcome for a transmission to device 10. In this case, the signal reception at the device 10 may be degraded significantly by the interference caused by the device 30, due to the fact that the device 10 is in the communication range of the device 30. This may establish a specific case for directional communication of the hidden node problem (HNP).

Figure 6B:
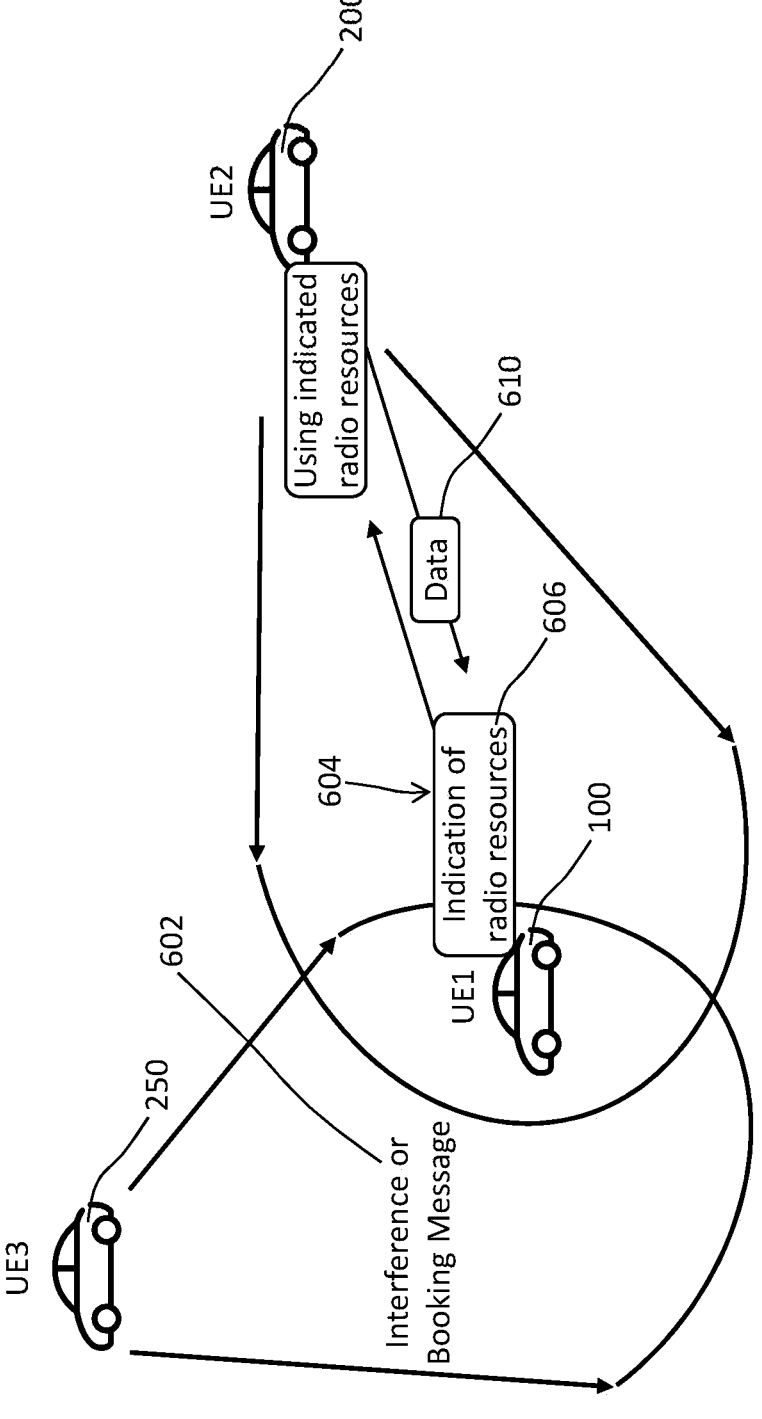
FIG. 6B schematically illustrates an example of a radio environment comprising embodiments of the radio devices of FIGS. 1 and 2 in a directional radio communication.

FIG. 6B schematically illustrates an embodiment of a radio network 500 comprising at least one embodiment of the receiving device 100 and at least one embodiment of the transmitting device 200 in directional radio communication. The radio network 500 further comprises an interferer 250, which may be another transmitting device of the radio network 500.

According to the radio signals 602 received from the interferer 250, one or more radio resources may be occupied at the receiving device 100. The received radio signals 602 may comprise interference (e.g., some other data transmission) or may be indicative of (e.g., at least some of) the occupied radio resources, e.g., booking messages. The received radio signals enable the receiving device 100 to determine the one or more radio resources 606 in the step 302.

Herein, a spatial stream may relate to at least one of a direction or parameters of a directional transmission, a direction or parameters of a directional reception and a multiple-input multiple-output (MIMO) channel or parameters of the MIMO channel. The spatial stream may also be referred to as a spatial radio resource.

The occupied radio resources may be defined in terms of time, frequency, spatial stream or any combination or sub-combination thereof. The one or more indicated radio resources 606 may be defined in terms of time, frequency, spatial stream or any combination or sub-combination thereof. For example, the one or more indicated radio resources 606 may comprise the occupied radio resources as excluded resources. Particularly, the status message 604 may be indicative of an occupied spatial stream as being excluded. Alternatively or in addition, the one or more indicated radio resources 606 may comprise the radio resources that are receivable at the receiving device 100 and unoccupied based on the received radio signals 602. Particularly, the status message 604 may be indicative of an unoccupied spatial stream as being preferred.

The receiving device 100 transmits the status message 604 indicative of one or more determined radio resources in the step 304. The transmitting device 200 uses the one or more indicated radio resources 606 for transmitting the data 610 in the step 406.

The radio network 500 may be a 3GPP NR implementation. The radio communication between the transmitting device 200 and the receiving device 100 may employ SL unicast and/or SL multicast. For unicast or multicast, directional transmission is more efficient in terms of beamforming gain and/or less interference to other UEs 250 not participating in the radio communication. More specifically, for SL unicast or SL multicast, the SA (e.g., the booking message) and/or the data can be directionally transmitted to one or more target UEs, e.g., embodiments of the receiving device 100.

Hereinbelow, inter alia 3GPP implementations of the method 300 at or for an embodiment of the receiving UE 100 are described. The method 300 may be implemented as a method of suggesting radio resources to other UEs.

The receiving UE 100, exemplified by UE1 in FIG. 6B, may have a set of preferred radio resources 606 from its perspective, e.g., obtained from its own local channel sensing in the step 302 (i.e., based on the received radio signals). Herein, the preferred radio resources 606 may encompass the radio resources that are interpreted by the receiving UE 100 as idle, vacant or unoccupied. The receiving UE 100 can indicate its latest preferred radio resources 606 for reception 306 to other UEs 200 as radio resource suggestions 604 for transmissions 406 from the other UEs 200 to the receiving UE 100.

The set of preferred radio resources at the receiving UE 100 for reception 306 may also be associated with a set of measurement values that indicate the measured interference level (e.g., the average interference expressed in terms of RSRP or RSSI or congestion measurement) at the radio resources over a certain period, which may be preconfigured or configured by the eNB or gNB 502.

In one implementation of the method 300, the receiving UE 100 may only indicate the preferred time-frequency resources in conjunction with the at least one spatial stream, i.e. those radio resources on the at least one radio stream whose measured interference 602 is below a predefined threshold value, so that UEs 200 receiving such information 604 shall prioritize transmission 406 on such radio resources 606. In another implementation, which is combinable with the one implementation, the receiving UE 100 only indicates the radio resources 606 whose interference is above a predefined threshold value, in which case UEs 200 receiving such information 604 shall not prioritize transmission on such radio resources 606.

The at least one spatial stream may be implied by the status message 604. For example, if the receiving device 200 determines in the step 302 that it is capable of receiving the data 610 using a direction reception 306 in the presence of the interference 602 (e.g., on the same frequency and/or at the same time) arriving at the receiving device 100 in another direction. Optionally, the receiving UE 100 may signal by means of the status message the remaining degree of freedom for a MIMO reception 306, e.g., at the particular radio resource 606 as a preferred radio resource or as an excluded radio resource if the radio resource is booked for transmission and/or reception in the imminent future.

For example, if the receiving UE 100 is receiving a data stream on resource X using 2 receive antennas and has two further (i.e., unused) receive antennas, the receiving UE 100 can associate the 2 left degrees of freedom for possible reception 306 and decoding. The status message 604 may be indicative of the number of unused spatial degrees of freedom.

In any embodiment or implementation, the status message 604 may be transmitted in the step 304 by including a (e.g., dedicated) field in the sidelink control information (SCI) to indicate the radio resource 606. That is, the status message 604 may be implemented by control signaling transmitted in the sidelink control channel. This resource suggestion field implementing the status message 604 is used to assist other UEs 200 in selecting radio resources for future transmissions 406 to the receiving UE 100. The status message 604 is different from an existing field for resource reservation, e.g., in conventional SCI, which is transmitted by the transmitting UE 200 and/or is used to indicate resources reserved by the UE 100 for its own future transmissions (e.g., a trigger for or a response to the data 610).

In some embodiments, the receiving UE 100 excludes the one or more preferred resources 606, or a subset of them, from its candidates of locally available radio resources.

Alternatively or in addition, the one or more indicated radio resources 606 are transmitted together with other data (i.e. 608 in FIG. 7) of the receiving UE 100. For example, the status message 604 is piggybacked in a data packet transmitted by the receiving UE 100 in the PSSCH.

Figure 7:
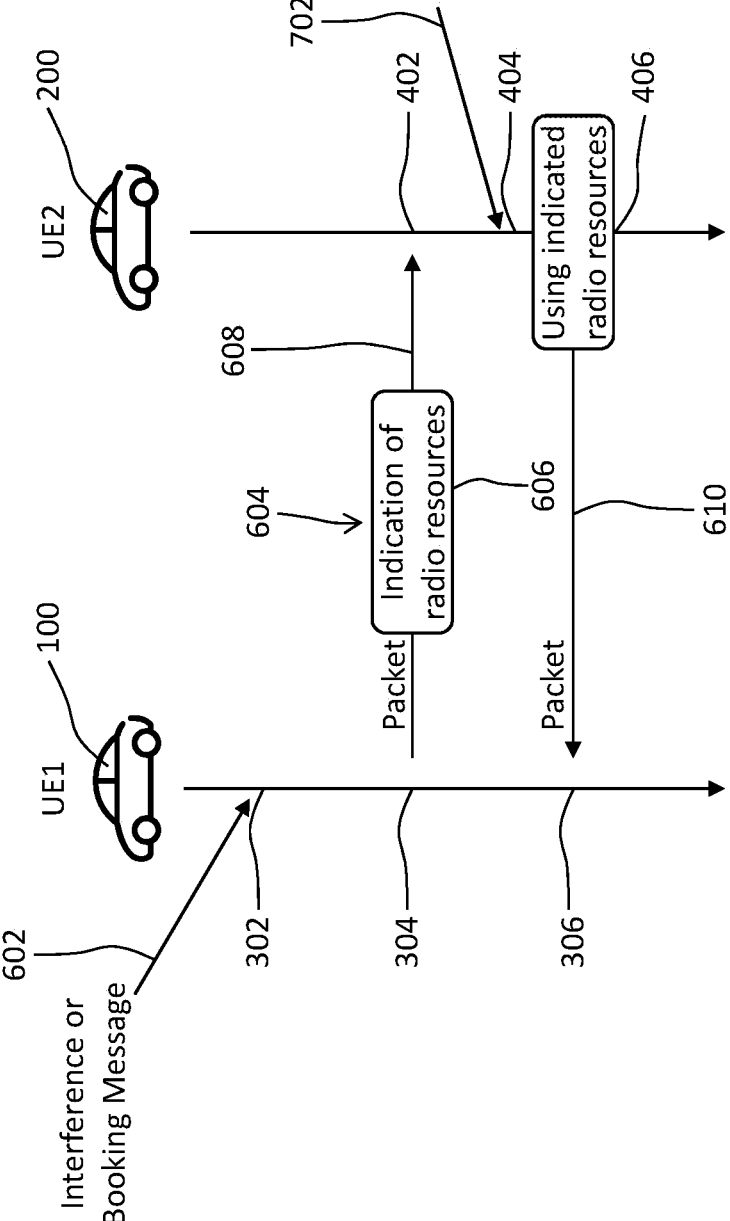
FIG. 7 shows a schematic signaling diagram resulting from embodiments of the radio devices of FIGS. 1 and 2 in a directional radio communication.

FIG. 7 shows a schematic signaling diagram 700 for implementing the status message 604, e.g., included in a data transmission 608 from the receiving device 100 to the transmitting device 200. The receiving UE 100 intends to transmit a packet 608 to the transmitting UE 200. The receiving UE 100 can piggyback the indication, i.e., the status message 604, of the one or more determined radio resources 606 in the packet 608.

In any embodiment, the sensing of a channel 702 at the transmitting device 200 in the step 404 may be implemented analogously to the receiving 302 of the radio signals 602 at the receiving device 100 in the step 302. A difference, e.g., the only difference, may be that the result of the step 302 is transmitted to the transmitting device 200 by means of the status message 604 in the step 304, which is received in the step 402 at the transmitting device 200. The result of the sensing of a channel 702 at the transmitting device 200 may be combined with the one or more radio resources 606 indicated in the status message 604 in the step 404, yielding the at least one radio resource used at the transmitting device 200 in the step 406.

Alternatively or in addition, even though there is no data packet 608 to be transmitted from the receiving UE 100 to the transmitting UE 200, the receiving UE 100 can transmit the resource suggestions 606 on the PSSCH to other UEs 200. This can be done based on a pre-configured periodicity or triggered by a request from other UEs 200.

In any embodiment or implementation, the indication 604 of the one or more radio resources 606 may be transmitted only if there are changes in the one or more (e.g., preferred or excluded) determined radio resources compared to a radio resource previously used for the radio communication (e.g., compared to a previous subframe transmitted from receiving UE 100). The change may comprise a change in time (e.g., relative to a periodic radio frame structure), in frequency and/or in the at least one spatial stream of the radio resources. Alternatively or in addition, the indication 604 of one or more radio resources 606 is only transmitted if the measurements (e.g., interference measurements) of the one or more radio resources (e.g., time, frequency or spatial resources) significantly changes compared with a previous indication 604. For example, the status message 604 may be transmitted responsive to a change of the RSRP and/or the RSSI of the previously indicated radio resources 606, e.g., if the RSRP and/or the RSSI of the same (or temporally corresponding) radio resources currently measured exceeds and/or falls below an (e.g., absolute or relative) threshold value with respect to previous measurement.

Alternatively or in addition, the status message 604 (e.g., suggestions and/or exclusions) indicative of the one or more determined radio resources 606 is transmitted in a special or dedicated channel. The channel may be specifically or exclusively defined or reserved for the transmission 304 of the status message 604, i.e., any implementation of an indication of the one or more radio resources 606 and optionally other related information.

In any embodiment or implementation, the status message 604 may imply a certain spatial stream as the at least one spatial stream. For example, a spatial stream previously used for the radio communication and/or parameters for a directional reception from the transmitting device 200 at the receiving device 100 may be implied by the status message 604. Alternatively or in addition, the status message 604 may be expressly indicative of the one or more radio resource 606 in terms of a resource locations in the time-frequency domain. For example, if the at least one spatial stream is implied, the status message 604 may be expressly indicative only of the resource locations in the time-frequency domain.

The at least one spatial stream may be indicated in the status message 604 by a spatial degree of freedom (DoF) that the receiving device 100 is capable of using for the reception 306. That is, the at least one spatial stream, as indicated in the status message 604 (e.g., as a radio resource recommendation), may comprise a (e.g., maximum or preferred) rank of the radio communication or a (e.g., maximum or preferred) number of the at least one spatial stream. For example, the radio communication may comprise a MIMO channel or a SIMO channel. The DoF may correspond to the (e.g., maximum or preferred) rank of the channel at the end of the receiving device 100. In the case of a SIMO channel for the radio communication, the indicated DoF may be one (1). The SIMO channel may be implemented by a direction reception 306 at the receiving device 100. The transmission 304 of the status message 604 may imply that the DoF is equal to 1 or greater than 1. For example, the transmission 304 of the status message 604 may imply that the receiving device 100 is ready for the reception 306, wherein interference is suppressed at the receiving device 100 by means of the directional reception.

In any embodiment or implementation, the one or more indicated radio resources 604 (e.g., the radio resource suggestions) may comprise not only the at least one spatial stream but also resource locations in the time-frequency domain and/or other related information. The related information may include, without being limited thereto, a capability of the receiving UE 100 (e.g., in terms of receivable bandwidth, number of subcarriers, number of receiver chains, etc.), a threshold value used in the channel sensing for the step 302 at the receiving UE 100 (e.g., the threshold value used in the above-mentioned second sensing step), the carrier and/or frequency associated to time and/or frequency resources measured (e.g., by receiving the signals 602) in the step 302, etc.

In the status message 604, the receiving UE 100 may signal a priority, e.g., together with the one or more indicated radio resources 606. The priority may be indicative of other data scheduled to be transmitted on the corresponding radio resource 606 from another radio device (e.g., the radio device 250, another embodiment of the transmitting UE 200 or any radio device in the radio network 500). For example, a priority may be associated with each of the one or more radio resources 606. The priority may depend on at least one of an absolute priority or ranking, a type of the other data, a type of service, a Quality of Service (QoS) Class Identifier (QCI) for the data and/or the service, a destination of the other data, etc. The priority may be a feature of the data and/or the other radio device transmitting the other data.

The receiving UE 100 may determine the priority of the other data that are going to be transmitted using at least one of the one or more indicated radio resources (e.g., certain time-frequency resources) based on a SA, booking message or SCI received from the other radio device. Alternatively or in addition, a buffer status report may be indicative of a size of the other data to be transmitted by the other radio device, and the priority may depend on the size.

If other data of different priorities is scheduled on one of the one or more indicated radio resources, the status message 604 may be indicative of the highest priority of the different priorities.

If the other data is scheduled for reception at the receiving UE 100 (i.e., the UE 100 is also the receiver of the other data) and the receiving UE 100 is capable of receiving the data 610 and the other data on different spatial streams (e.g., at the same time and frequency), the receiving UE 100 may indicate to the transmitting UE 200 the spatial DoF remaining for the reception 306 of the data 610 (e.g., without indicating a priority of the other data). Alternatively or in addition, different status messages 604 may be unicasted in the step 304 to different embodiments of the transmitting UE 200 scheduled for the same time and frequency, wherein the different status messages 604 are indicative of the different spatial streams that are independently receivable at the receiving UE 100.

In any embodiment or implementation, the receiving UE 100 may selectively perform the method 300, particularly the step 304, e.g., depending on its capability and/or if the full-sensing procedure is performed (e.g., as part of the step 302). For example, the receiving UE 100 performs the radio resource suggestion only if it is capable of full-sensing and has actually performed full-sensing. Alternatively or in addition, during a period of RAN coverage, the RAN 500, e.g., a serving base station 502, may configure the UEs (or a proper subset of the UEs) to perform the method 300 (i.e. the resource suggestion). Any UE 100 may be selectively configured to perform the method 300 based on, e.g., the capability of the respective UE 100 and/or a configuration of a pool of radio resources. The pool of radio resources may comprise radio resources available in the radio network 500 for the SL communications.

In any embodiment of the receiving UE 100, the step 304 may implement the transmitting of the radio resource suggestions 604 in a unicast or multicast mode. Alternatively or in addition, the step 304 may implement the transmitting of the radio resource suggestions 604 in a broadcast mode.

In any embodiment of the receiving UE 100, e.g., with a half-duplex limitation for the radio communication, the receiving UE 100 may take into account not only channel measurements when determining the set of available radio resources 606 as preferred radio resources in the step 302. For example, the receiving UE 100 may take into account a time resource X in which another transmission (e.g., a trigger of or a response to the data 610) from the receiving UE 100 is expected or scheduled. The receiving UE 100 does not indicate, e.g., in a list of available or preferred radio resources 606 indicated in the status message 604 to the transmitting UE 200, the subframe X in which the receiving UE 100 expects to perform its own transmission. By way of example, if the receiving UE 100 has already reserved some frequency resources in subframes X for its own transmission (e.g., already signaled in the SCI), the receiving UE 100 excludes all the radio resources in the subframe X from the list of available or preferred radio resources 606 and/or indicates the radio resources 606 in the subframe X as excluded radio resources 606.

A number of (e.g., independently operative) receiver chains (RX chains) at the receiving UE 100 or supported by the receiving UE 100 may be limited. In other words, an embodiment of the receiving UE 100 may be capable of simultaneously receiving a certain number of sidelink carriers or sidelink channels. The status message 604 indicative of a set of the one or more preferred radio resources, which is transmitted to the transmitting UE 200 in the step 304, takes the number of RX chains into account.

In one implementation example, the receiving UE 100 may indicate in the set of preferred radio resources 606 certain subframes for a given frequency A. Due to a limited number of RX chains at the receiving UE 100, such subframes may be excluded from the set of preferred radio resources for the data reception 306 on all those frequencies in which the receiving UE 100 is not capable to receive simultaneously with frequency A. The set of such subframes (e.g., subframes exclusively available for the frequency A) may be represented by a time-division multiplexing (TDM) pattern. The TDM pattern may be signaled in the same status message 604 (e.g., in another field) or in a further status message 604 separately from the radio resources (e.g., time-frequency resources for each of the at least one spatial stream) that are sensed in the step 302 to be vacant (also referred to as idle or unoccupied).

In another implementation example, the one or more radio resources 606 determined in the step 302 to be vacant are reduced by excluding RX conflicts due to the limited RX capability of the receiving UE 100. In other words, the one or more radio resources 606 indicated in the status message 604 jointly considers the TDM pattern, in which the receiving UE 100 is not available to receive due to the limited RX capability, and the time-frequency resources that are measured to be vacant. For example, even if a certain time-frequency resource is measured to be vacant, it is excluded from the list of preferred radio resources 606 indicated in the status message 604, if the receiving UE 100 is not able to receive on said radio resource due to limited RX capability.

Hereinbelow, inter alia 3GPP implementations of the method 400 at or for an embodiment of the transmitting UE 200 are described. The method 400 may be implemented as a method of selecting radio resources by taking into account received suggestions and/or exclusions for one or more radio resources.

When one or more embodiments of a UE 200 other than the receiving UE 100 receive the status message 604 (e.g., indicative of the radio resource suggestions) from the receiving UE 100 in the step 402, the UE 200 can take into account the one or more indicated radio resources (e.g., the radio resource suggestions) during its own resource selection process in the step 404. FIGS. 6B and 7 schematically illustrate an embodiment of the UE 200. The UE 200 may be referred to as a transmitting UE 200, because it transmits or selectively transmits the data 610 to the receiving UE 100.

Optionally, the transmitting UE 200 receives the status message 604 from each of multiple embodiments of the UE 100 in the step 402. The step 404 performed by one embodiment of the UE 200 may determine the at least one radio resource based on the radio resources indicated in the multiple status messages 604 received from the multiple UEs 100. For example, the at least one radio resource may comprise the intersection of the sets of one or more radio resources indicated by the multiple UEs 100 to which the data 610 is to be multicasted in the step 406.

How to consider the one or more indicated radio resources (e.g., the radio resource suggestions) may depend on many factors, e.g., including at least one of a capability of the transmitting UE 200, one or more intended receivers of the transmitting UE 200, a time gap between the reception 402 at the transmitting UE 200 and the transmission 406 from the transmitting UE 200, a comparison between the one or more indicated radio resources (e.g., the suggested or preferred radio resources) and a result of the channel sensing performed at the transmitting UE 200 in the step 404 and the combination of multiple status messages 604 (e.g., captured suggestions) from several surrounding UEs 100.

Some embodiments of the transmitting UE 200 may only consider the one or more (e.g., preferred) radio resources 606 indicated in the status message 604 from receiving UE 100. E.g., a P-UE may rely upon the received radio resource suggestions.

Some alternative embodiments of the transmitting UE 200 comprise an advanced UE, e.g., a V-UE. The advanced UE 200 may have the capability to implement full-sensing based radio resource selection in the step 404. In this case, the transmitting UE 200 can compare the one or more radio resources 606 indicated (e.g., suggested) by the receiving UE 100 with its own preferred radio resources resulted from its local channel sensing (e.g., locally vacant radio resources).

If there is an intersection between the two sets of resources, the transmitting UE 200 can select the at least one radio resource within the intersection for its transmission 406 to the receiving UE 100. Optionally, if there are multiple intersected radio resources, the transmitting UE 200 can select one of them, e.g., based on certain criteria or randomly (e.g., by means of a pseudo random generator).

In the example illustrated in FIG. 6B, the transmitting UE 200 determines (e.g., selects) in the step 404 the resource Y as the at least one radio resource for its transmission 406 to the receiving UE 100. In this way, the quality of signal reception 306 at the receiving UE 100, e.g., a signal to noise ratio (SINR), can be improved, since the signal reception 306 is not interfered by the transmission 602 of the interfering UE 250.

In one variant, if there is no intersection (i.e., overlapping) between the two sets of preferred resources of the receiving UE 100 and the transmitting UE 200 (i.e., the set of one or more preferred radio resources indicated in the status message 604 and the set of one or more preferred radio resources resulting from local channel sensing in the step 404), the transmitting UE 200 may determine (e.g., select) the at least one radio resource by considering only its own preference. In another variant, if there is no intersection, the transmitting UE 200 does not transmit, e.g., not until a further status message 604 is received according to the step 402. In a further variant, if there is no intersection, the transmitting UE 200 determines (e.g., selects) the at least one radio resources from the radio resources which are less or least interfered in the two sets. In other words, the transmitting UE 200 may sort the available radio resources in the two sets in an order of increasing interference (e.g., one order merging both sets). The transmitting UE 200 may pick the amount of radio resources necessary to transmit the data 610, e.g., to accommodate a MAC PDU from such ordered list. In yet another variant, the transmitting UE 200 transmits in certain resources randomly selected from the two sets.

In any embodiment or implementation, e.g., as disclosed in the context of some of the previous embodiments of the receiving device 100, the receiving UE 100 signals less preferred or excluded radio resources 606. For example, the status message 604 may be indicative of a set of one or more radio resources that are more or most interfered at the receiving UE 100. In this case, the transmitting UE 200 excludes or avoids from its set of transmitting radio resources (e.g., resulting from its local channel sensing in the step 404) the one or more radio resources indicated in the status message 604 from the receiving UE 100 as excluded or interfered. In other words, the transmitting UE 200 determines (or selects) in the step 404 resources by performing a local sensing at the transmitting UE 200, resulting in local candidates for the determined radio resources. If the set of local candidates for the at least one radio resource overlaps with one or more radio resources 606 indicated by the receiving UE 100 as excluded, such overlapping radio resources are excluded from the set of local candidates. If the whole set of local candidates for the at least one radio resource overlaps with the excluded radio resources, the transmitting UE 200 does preferably not transmit, e.g., until reception 402 of a further status message 604.

Alternatively or in addition, the transmitting UE 200 excludes, from its set of local candidates of radio resources, the radio resources in which the transmitting UE 200 intends or is scheduled to transmit to some UE other than the receiving UE 100, e.g., if the time and/or frequency resources in which the transmitting UE 200 intends or is scheduled to transmit are signaled as preferred radio resources 606 by the receiving UE 100. That is, the transmitting UE 200 ignores such one or more preferred radio resources (e.g., preference or suggestion) indicated by the receiving UE 100.

In any embodiment, the transmitting UE 200 may take into account a preference level of each of the one or more radio resources indicated in the status message 604 when determining the at least one radio resource according to the step 404. Alternatively or in addition, e.g., in the step 404, the transmitting UE 200 may take into account a priority of the data 610 (or of a corresponding data packet) that is going to be transmitted in the step 406 using the at least one determined radio resource. The priority of the data 610 may be compared with the priority of other data scheduled for transmission in the corresponding radio resource, e.g., as disclosed in the context of some of the previous embodiments of the receiving UE 100. In case the priority associated to certain radio resources 606 as indicated by the receiving device 100 in the status message 604 is higher than the priority of the data 610 that the transmitting UE 200 intends or is scheduled to transmit, the transmitting UE 200 excludes such radio resources from the set of candidates for the at least one radio resource for the transmission 406. Otherwise, the transmitting UE 200 may include or not exclude in the set of candidates those radio resources for which the status message 604 is indicative of lower-priority data.

Alternatively or in addition, the transmitting UE 200 is a UE with limited capability and/or energy constraint, e.g., a P-UE. Such a UE 200 may perform only a simplified resource selection process in the step 404, e.g., including at least one of a partial-sensing based radio resource selection, a pure random resource selection and full-sensing based radio resource selection with reduced complexity (e.g., by omitting some the sensing steps in the radio resource selection procedure).

In some implementations, the transmitting UE 200 performs resource selection in the step 404 based partial channel sensing (briefly: partial sensing) in conjunction with the one or more indicated radio resources 606. Partial sensing means that the transmitting UE 200 only senses (e.g., and only can sense) a limited set of radio resource candidates, say a set E or sensed candidates, and determines (e.g., selects) the at least one radio resource within the set E according to the step 404. If there is an intersection between the one or more preferred radio resources 606 indicated in the status message 604 received from the receiving UE 100 (briefly: indicated candidates of UE 100) and the one or more radio resources resulting from the partial sensing at the transmitting UE 200 (briefly: local candidates of UE 200, which is a subset of the sensing candidates), the transmitting UE 200 determines (e.g., selects) the at least one radio source within the intersection for the transmission 406 to the receiving UE 100. Optionally and additionally, if all of the sensing candidates in the set E are perceived as occupied at the transmitting UE 200 (e.g., with high energy, i.e., severe interference would be generated by using these resources for the transmission 406), the transmitting UE 200 may determine (e.g., select) the at least one radio resource for the transmission 406 among the indicated candidates of the receiving UE 100, e.g., even though that at least one radio resource does not belong to the original sensing candidates (i.e., is not in the set E) of the transmitting UE 200.

Alternatively or in addition, the transmitting UE 200 implements a purely random selection of radio resources, which does not consider any local sensing procedure at all. The transmitting UE 200 select in the step 404 the at least one radio resource from the one or more preferred radio resources indicated in the status message 604 from the receiving UE 100 (briefly: indicated candidates of UE 100), which is a radio resource seemed idle by at least the receiving UE 100. In this way, the interference situation in the entire radio network 500 can be improved, e.g., compared to a pure random resource selection at the transmitting UE 200 among the local candidates of the transmitting UE 200.

Alternatively or in addition, the transmitting UE 200 implements a resource selection scheme in the step 404 based on a full-sensing procedure in conjunction with the indicated candidates of the receiving UE 100. Optionally, one or more of the sensing steps are omitted to reduce complexity. For the omitting of one or more sensing steps, the transmitting UE 200 may utilize the one or more preferred radio resources (i.e., the suggestions) indicated by the receiving UE 100 to skip a sensing step, e.g., the above-mentioned third sensing step. More specifically, the transmitting UE 200 may compare the available radio resources resulting from the above-mentioned second sensing step with the one or more preferred radio resources (i.e., the suggested resources) indicated in the status message 604 from the receiving UE 100. The comparing may include finding their intersection (e.g., if existent).

In any embodiment or implementation, if a time gap between the reception 402 of the status message 604 (e.g., the reception of the resource suggestions) and the transmission 406 of the data 610 (e.g., the transmitting UE 200 starting to transmit to receiving UE 100) is less than a threshold value, the transmitting UE 200 may take the one or more radio resource 606 indicated in the status message 604 (e.g., the suggestions) received from the receiving UE 100 into account during the radio resource selection process of step 404.

In any embodiment or implementation, between the reception 402 of the status message 604 (e.g., the reception of the resource suggestions) and the transmission 406 of the data 610 (e.g., the transmitting UE 200 starting to transmit to receiving UE 100) is greater than a threshold value (e.g., the afore-mentioned threshold value), the transmitting UE 200 preferably does not take the one or more radio resource 606 indicated in the status message 604 (e.g., the suggestions) into account during the radio resource selection process of step 404.

In any embodiment or implementation, if the receiving UE 100 is an intended receiver of the transmitting UE 200, the transmitting UE 200 considers the one or more preferred radio resources (e.g., resource suggestions) indicated by the receiving UE 100 during its own resource selection procedure, e.g., also for transmission to radio devices other than the receiving UE 100. Alternatively or in addition, if the receiving UE 100 is not an intended receiver of the transmitting UE 200, or if the transmitting UE 200 targets multiple receivers (e.g., in a multicast or broadcast transmission mode), the status message 604 (e.g., the resource suggestions) from the receiving UE 100 are optionally not taken into account.

In any embodiment or implementation, the status message 604 may be indicative of the at least one spatial stream by including at least one (e.g. preferred) spatial radio communication parameter (e.g., as a spatial radio resource recommendation) in the status message 604. The spatial radio communication parameter may comprise a spatial transmission parameter and/or a spatial reception parameter. The spatial radio communication parameter, e.g., the spatial reception parameter, may comprise the DoF at the receiving UE 100.

By way of example, the status message 604 may be indicative of the at least one spatial stream by including the DoF that the receiving UE 100 may use for the reception 306.

For each of the at least one spatial stream, the status message 604 may be indicative of one or more spatial radio communication parameters. Optionally, for each of the at least one spatial stream, the status message 604 may be indicative of at least one radio resource in terms of time and/or frequency. That is, the status message 604 may be indicative of at least one time and/or frequency resource associated with each of the at least one spatial stream. For example, the status message 604 may comprise a list of parameters (e.g., including the at least one spatial control parameter and/or spatial DoF) associated with one or more time and/or frequency resources.

Based on the DoF indicated in the status message 604, the transmitting UE 200 may determine a transmission rank in the step 404. The transmitting UE 200 may be equipped with multiple transmit antennas, e.g. antenna elements of an antenna array. For example, the DoF indicated by the receiving UE 100 is N, the transmitting UE 200 may select a transmission rank up to the maximum of N and M, i.e., max (N, M), wherein M is the number of transmit antennas at the transmitting UE 200.

Furthermore, the status message 604 from the receiving UE 100 may indicate a low measured interference at time and/or frequency resource Z in conjunction with the at least one spatial stream (e.g., when coherently combining a number of antenna elements according to the DoF). Based on the status message 604 received in the step 402 and the transmission rank determined in the step 404, the transmitting UE 200 may apply a precoder for the MIMO transmission 406 with the determined rank using the time and/or frequency resource Z. Alternatively or in addition, based on an interference level implicitly or explicitly indicated by the resource suggestions in the status message 604 of an embodiment of the receiving UE 100, the transmitting UE

200 may determine (e.g., select) in the step 404 an appropriate modulation and coding scheme (MCS) for its transmission 406 to the receiving UE 100.

Some embodiments of the transmitting UE 200 are configured to determine (e.g., select) in the step 404 the at least one radio resource by jointly considering multiple received status messages 604 (e.g., captured suggestions) from multiple (e.g., several) embodiments of the receiving UE 100 in the radio network 500. The joint consideration may be implemented by determining the intersection of the multiple sets of one or more preferred radio resources 606 indicted in the respective status messages 604. Alternatively or in addition, the joint consideration may be implemented by determining the union of the multiple sets of one or more excluded radio resources 606 indicted in the respective status messages 604.

Alternatively or in addition, the transmitting UE 200 determines (e.g., selects) an intended receiver as the receiving UE 100 of the radio communication by jointly considering multiple received status messages 604 (e.g., captured suggestions or received recommendations) from multiple embodiments of the receiving UE 100, each being a candidate for the reception 306 of the data 610. For example, the multiple embodiments of the receiving UE 100 may comprise multiple surrounding UEs of a mesh radio network 500. In this case, there is no specific a priori receiver for the transmitting UE 200. For example, the transmitting UE 200 determines a next hop for multi-hop communication of the data 610.

Alternatively or in addition, the transmitting UE 200 may be involved in more than one sidelink communication session. That is, the radio communication of the transmitting UE 200 comprises multiple sidelink communication sessions. Each of the sidelink communication sessions is associated with an embodiment of the receiving UE 100 (i.e., the respective intended receiver). The transmitting UE 200 receives status messages 604 according to the step 402 from some or each of the intended receivers. The transmitting UE 200 considers the received status messages 604 (e.g., resource suggestions), if available, from all of the intended receivers during its own resource selection process in the step 404. For example, the transmitting UE 200 may determine (e.g., select) the at least one radio resource from the overlapping set of radio resources across multiple sets of one or more radio resources 606 indicated in the respectively received status messages 604.

Alternatively or in addition, the transmitting UE 200 may determine the at least one radio resource in the step 404 based on the multiple status messages 604 received from multiple embodiments of the receiving UE 100 (briefly: intended receivers) taking a correlation in a (e.g., current) location of the multiple intended receivers into account. The respective data 610 to be transmitted to each of the multiple intended receives may or may not be different for different intended receivers. For example, the transmitting UE 200 may jointly consider the sets of one or more preferred radio resources indicated in the respective status messages 604 received from the respective intended receiver to reinforce a selection of a clean or homogeneous usage of radio resource, e.g., in terms of time and/or frequency resources. By way of example, the transmitting UE 200 has multiple (e.g., 3) UEs 100 (i.e., intended receivers) in the radio network 500. The intended receivers 100 may be surrounding or neighboring UEs 100 of the UE 200. All or a majority of the intended receivers 100 indicate a radio resource X as preferred. For example, the respective status message 604 from each of the intended receivers 100 (or each of a majority thereof) is indicative of X as preferred radio resource 606. Furthermore, a minority of the intended receivers 100 (e.g., 1 out of the 3), indicates a radio resource Y as preferred radio resource 606. In this case, the transmitting UE 200 determines the radio resource X as the at least one radio resource for the transmission 406.

Alternatively or in addition, the transmitting UE 200 may determine whether to transmit in the step 406 in multicast mode or in unicast mode depending on the joint consideration of the sets of one or more radio resources from the respective intended receives each embodying a receiving UE 100. For example, if the transmitting UE 200 wants to transmit the same data 610 (e.g., the same data packet) to multiple 3 UEs and all 3 UEs suggest the same resource, the transmitting UE 200 may choose the multicast mode for an efficient radio resource utilization.

Figure 8:
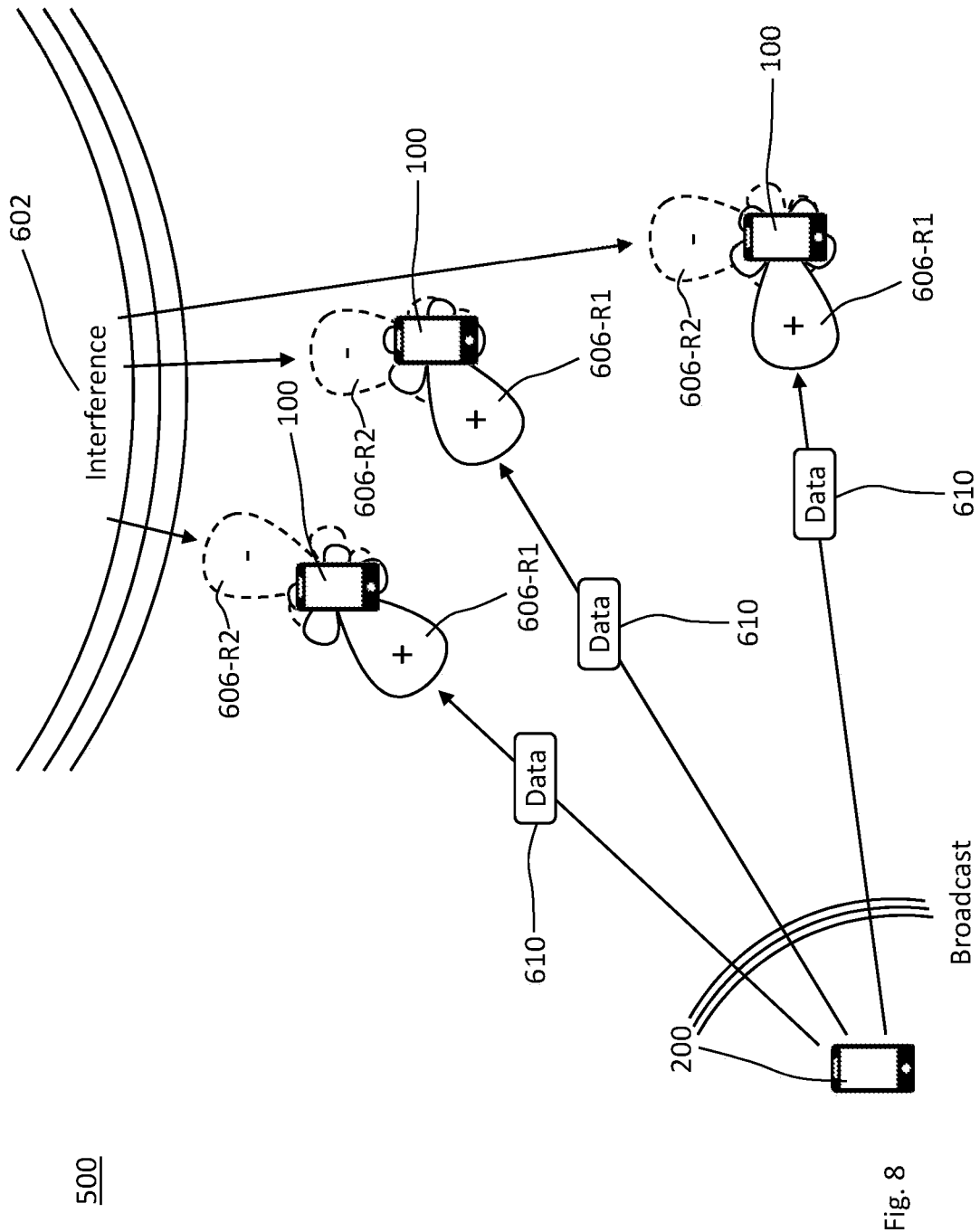
FIG. 8 schematically illustrates embodiments of the radio devices of FIGS. 1 and 2 in a directional radio communication using at least one spatial stream formed at the first radio device of FIG. 1.

FIG. 8 schematically illustrates embodiments of the receiving device 100, i.e., the first radio device, and the transmitting device 200, i.e., the second radio device, in a directional radio communication using at least one spatial stream for receiving data 610 at the receiving device 100 from the transmitting device 200.

The at least one spatial stream is formed at the receiving device 100. The receiving device 100 determines one or more radio resources 606-R1 based on radio signals received at the receiving device 100 in the step 302. The radio signals underlying the determination 302 comprise at least one of radio signals received from the transmitting device 200 and radio signals received from some other radio source, e.g., booking massages or interference 602. For example, the radio signals received from the transmitting device 200 carry some previously transmitted data.

The one or more radio resources 606-R1 are determined in the step 302 based on the radio signals received at the receiving device 100 as a spatial stream 606-R1 defined by first directional reception that amplifies the radio signals received from the transmitting device 200 and/or that suppresses the interference 602. Thus, the one or more determined radio resources comprise at least one spatial stream 606-R1 among different spatial streams 606-R1 and 606-R2 receivable at the receiving device 100. The other receivable spatial stream 606-R2 corresponds to a second directional reception defined by the interference 602.

Each of the spatial streams may be associated with a combining vector comprising complex-valued gains for coherently combining the radio signal of antenna elements for the respective directional reception. In a simplified implementation of the method 300, only the combining vector for the first directional reception of the spatial stream 606-R1 is computed by maximizing a directional gain towards the direction of reception for the transmitting device 200 and/or by maximizing RSRP or RSSI for the radio signal received from the transmitting device 200. In an advanced implementation, the combining vector for each of the radio signals from the transmitting device 200 and the interference 602 is determined using the additional constraint that the combining vectors corresponding to the transmitting device 200 and interference 602, respectively, are mutually orthogonal in a complex-valued vector space.

A status message 604 indicative of the one or more determined radio resources 606-R1 is transmitted to the transmitting device 200 in the step 304. For example, the status message 604 is (e.g., expressly or implicitly) indicative of a spatial DoF (e.g., equal to 1) available at the receiving device 100 for receiving on the spatial stream 606-R1.

By way of example, the transmitting device 200 can observe the interference 602. While a conventional transmitter might refrain from transmitting the data 610 to the receiver 100 on the time and/or frequency resource occupied by the interference 602, the status message 604 is indicative of the capability of the receiving device 100 to receive in the step 306 the data 610 on the spatial stream 606-R1, e.g., even if the same time and/or frequency resource is used. This is possible, because the receiving device 100 has at least one spatial DoF available for the reception 306 in the presence of the interference 602.

Accordingly, the data 610 is received in the step 306 from the transmitting device 200 at the receiving device 100 on the spatial stream 606-R1 as the at least one radio resource, which corresponds to the one or more radio resources 606-R1 indicated in the transmitted status message 604 by indicating the DoF.

As exemplified with reference to the embodiments of FIG. 8, the method 300 may be implemented as a method of selecting a directional reception (also: beamforming reception 306) at a receiver 100. The method 400 may be implemented as a method of performing a broadcast or omnidirectional transmission 406 in the presence of interference 602 based on a status message reception 402 indicative of a directional reception 306 of the broadcast or omnidirectional transmission 406.

Figure 9:
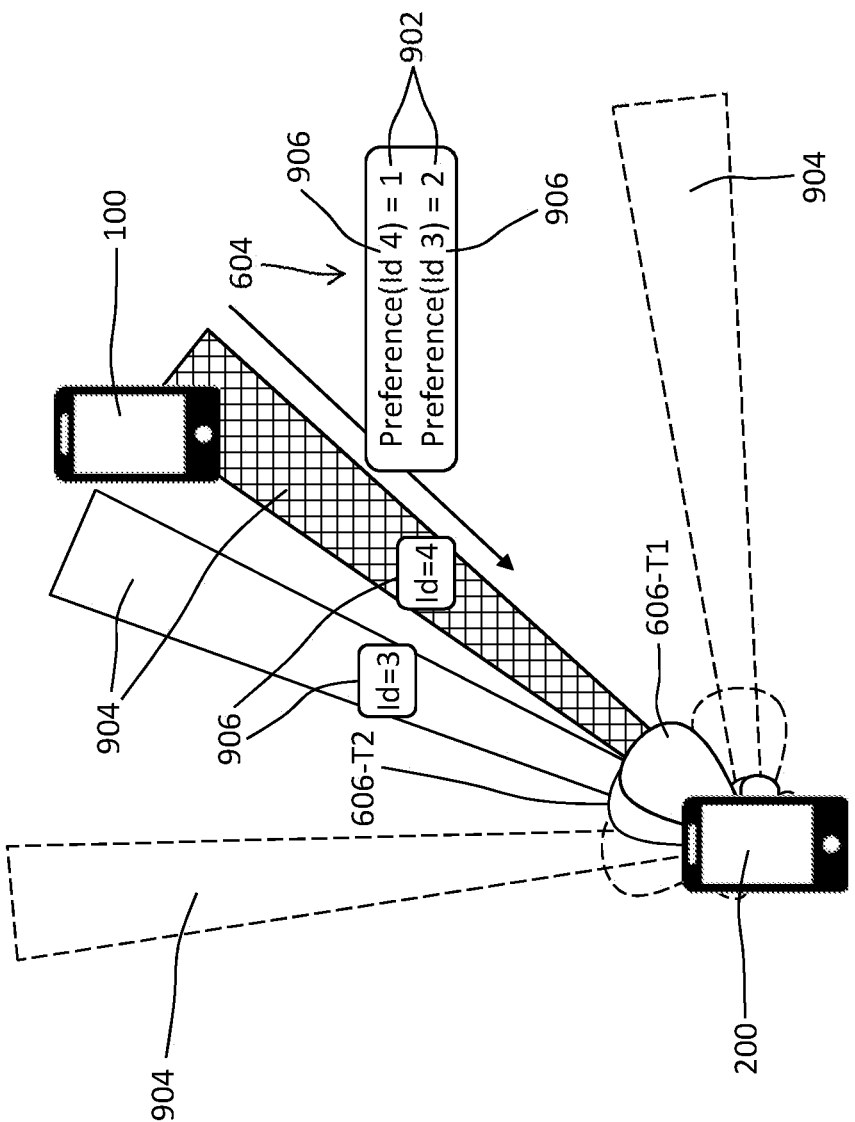
FIG. 9 schematically illustrates embodiments of the radio devices of FIGS. 1 and 2 in a directional radio communication using at least one spatial stream formed at the second radio device of FIG. 2.

FIG. 9 schematically illustrates embodiments of the receiving device 100, i.e., the first radio device, and the transmitting device 200, i.e., the second radio device, in a directional radio communication using at least one spatial stream for receiving data 610 at the receiving device 100 from the transmitting device 200.

The at least one spatial stream 606-T1 is formed at the transmitting device 200. The receiving device 100 determines one or more radio resources 606-T1 and 606-T2 based on radio signals 904 received at the receiving device 100 in the step 302.

The radio signals 904 underlying the determination 302 are transmitted using different spatial precoders for different directional transmissions from the transmitting device 200. At least a subset of the different directional transmissions is receivable at the receiving device 100 and, thus, defines the different spatial streams 606-T1 and 606-T2 receivable at the receiving device 100.

The radio signals 904 of the different directional transmissions are encoded with different signal identifiers 906. That is, different precoding vectors are applied to the radio signals 904 transmitted from the transmitting device 200, wherein the different precoding vectors correspond uniquely to the different signal identifiers 906 encoded in the radio signals 904.

The status message 604 is indicative of the one or more determined radio resources 606-T1 and 606-T2 by reference to the corresponding one or more signal identifiers 906. Optionally, as schematically illustrated in FIG. 9, the status message 604 is further indicative of a preference level 902 associated to each of the one or more indicated radio resources 606-T1 and 606-T2.

As exemplified with reference to the embodiments of FIG. 9, the method 300 may be implemented as a method of selecting a directional transmission (also: beamforming transmission 406) at a receiver 100. The method 400 may be implemented as a method of performing a directional transmission 406 based on a status message reception 402 indicative of the directional transmission 406.

Figure 10:
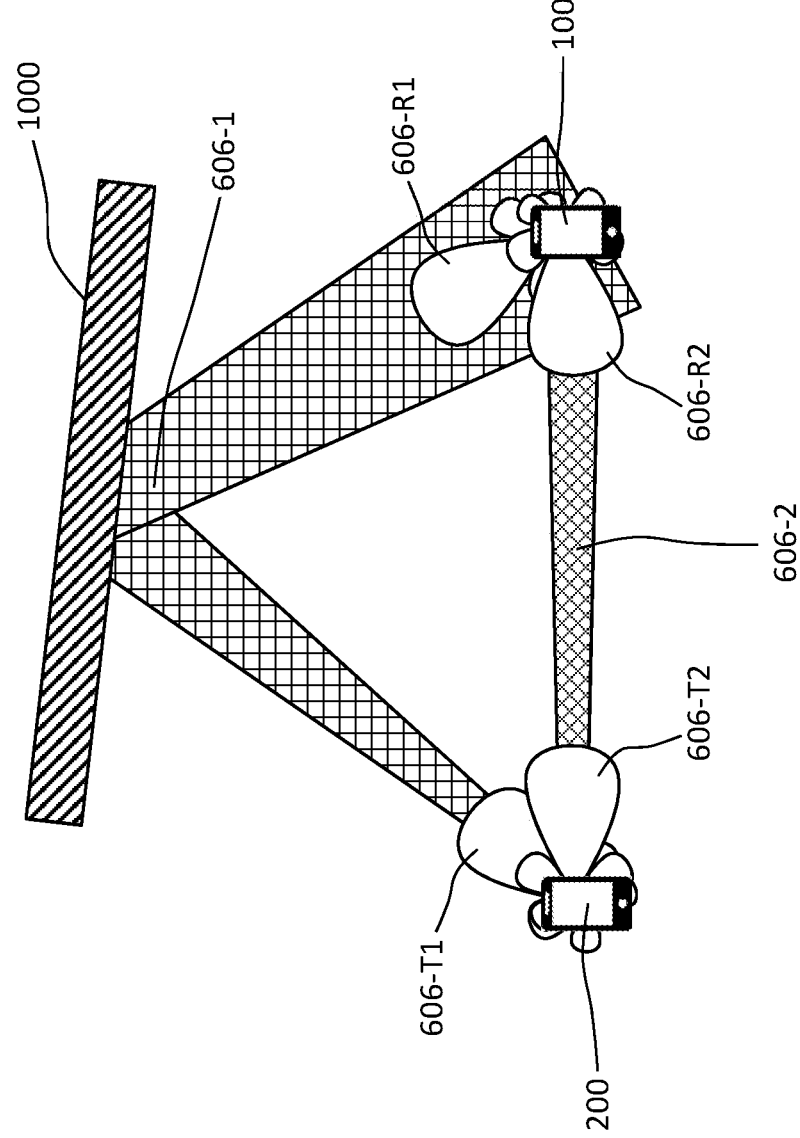
FIG. 10 schematically illustrates embodiments of the radio devices of FIGS. 1 and 2 in a directional radio communication using at least one spatial stream formed at both the first radio device of FIG. 1 and the second radio device of FIG. 2.

FIG. 10 schematically illustrates embodiments of the receiving device 100, i.e., the first radio device, and the transmitting device 200, i.e., the second radio device, in a radio communication using a MIMO channel comprising at least one spatial stream for receiving data 610 at the receiving device 100 from the transmitting device 200.

The embodiments of the devices 100 and 200 in FIG. 10 may be implemented by combining features of the embodiments of the devices 100 and 200, respectively, from both FIGS. 8 and 9.

The at least one spatial stream comprises two spatial streams 606-1 and 606-2 in the example of FIG. 10. Each of the at least one spatial stream is formed at both the receiving device 100 and the transmitting device 200 by precoding and coherently combining antenna elements, respectively. The receiving device 100 determines one or more of radio resources comprising at least one of the spatial streams 606-1 and 606-2 based on reference signals (RS, e.g., mobility RS or demodulating RS) received at the receiving device 100 in the step 302.

The status message 604 is indicative of the one or more determined spatial radio resources, namely the one or more spatial streams 606-1 and 606-2. For example, the status message 604 is indicative of a rank for the MIMO channel comprising the one or more spatial streams 606-1 and 606-2.

As exemplified with reference to the embodiments of FIG. 10, the method 300 may be implemented as a method of selecting one or more spatial streams 606-1 and 606-2 at a receiver 100 for a MIMO channel. The method 400 may be implemented as a method of performing a MIMO transmission 406 based on a status message reception 402 indicative of the MIMO channel, e.g., the rank and/or precoding matrices to be used for the MIMO transmission 406.

Figure 11:
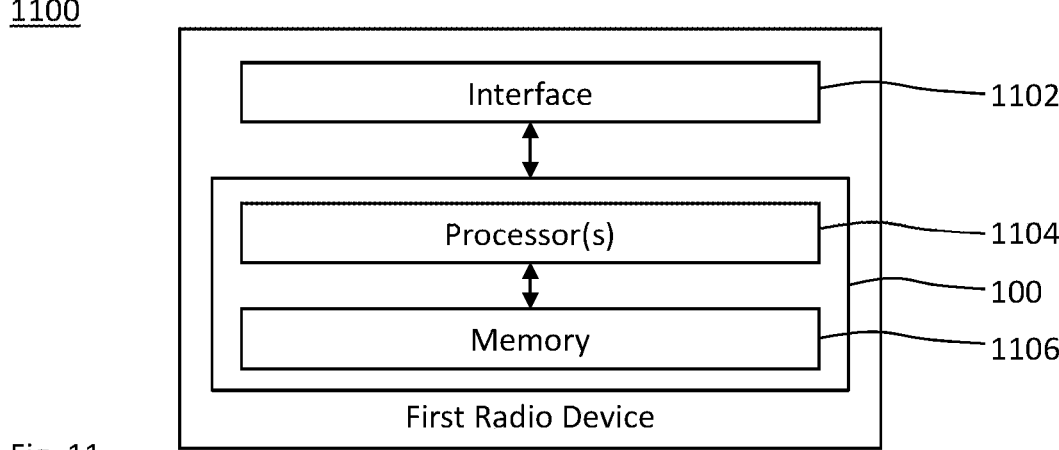
FIG. 11 shows a schematic block diagram of an embodiment of the first radio device of FIG. 1.

FIG. 11 shows a schematic block diagram for an embodiment of the device 100. The device 100 comprises one or more processors 1104 for performing the method 300 and memory 1106 coupled to the processors 1104. For example, the memory 1106 may be encoded with instructions that implement at least one of the modules 102, 104 and 106.

The one or more processors 1104 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1106, receiver functionality. For example, the one or more processors 1104 may execute instructions stored in the memory 1106. Such functionality may include providing various features and steps discussed herein, including any of the benefits disclosed herein. The expression "the device being operative to perform an action" may denote the device 100 being configured to perform the action.

As schematically illustrated in FIG. 11, the device 100 may be embodied by a first radio device 1100, e.g., functioning as a receiving UE. The first radio device 1100 comprises a radio interface 1102 coupled to the device 100 for radio communication with one or more radio devices and/or one or more other base stations.

Figure 12:
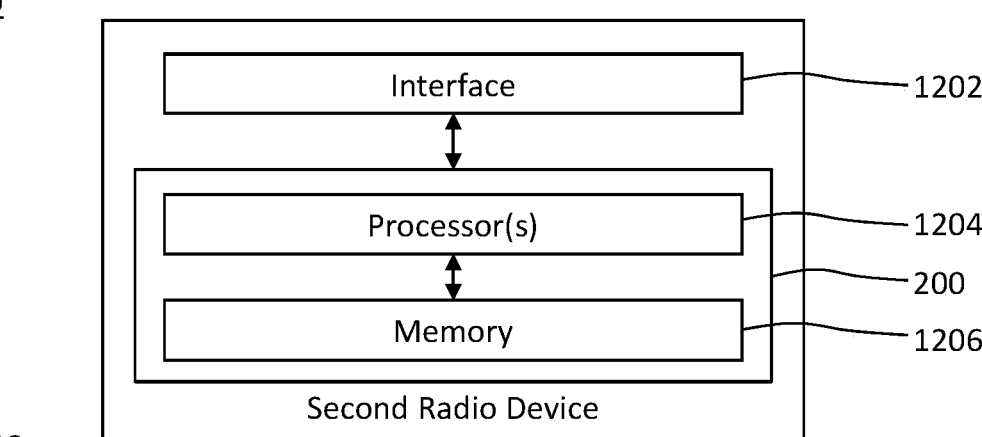
FIG. 12 shows a schematic block diagram of an embodiment of the second radio device of FIG. 2.

FIG. 12 shows a schematic block diagram for an embodiment of the device 200. The device 200 comprises one or more processors 1204 for performing the method 400 and memory 1206 coupled to the processors 1204. For example, the memory 1206 may be encoded with instructions that implement at least one of the modules 202, 204 and 206.

The one or more processors 1204 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as the memory 1206, transmitter functionality. For example, the one or more processors 1204 may execute instructions stored in the memory 1206. Such functionality may include providing various features and steps discussed herein, including any of the benefits disclosed herein. The expression "the device being operative to perform an action" may denote the device 200 being configured to perform the action.

As schematically illustrated in FIG. 12, the device 200 may be embodied by a 30 second radio device 1200, e.g., functioning as a transmitting UE. The second radio device 1200 comprises a radio interface 1202 coupled to the device 200 for radio communication with one or more radio devices and/or one or more other base stations.

Figure 13:
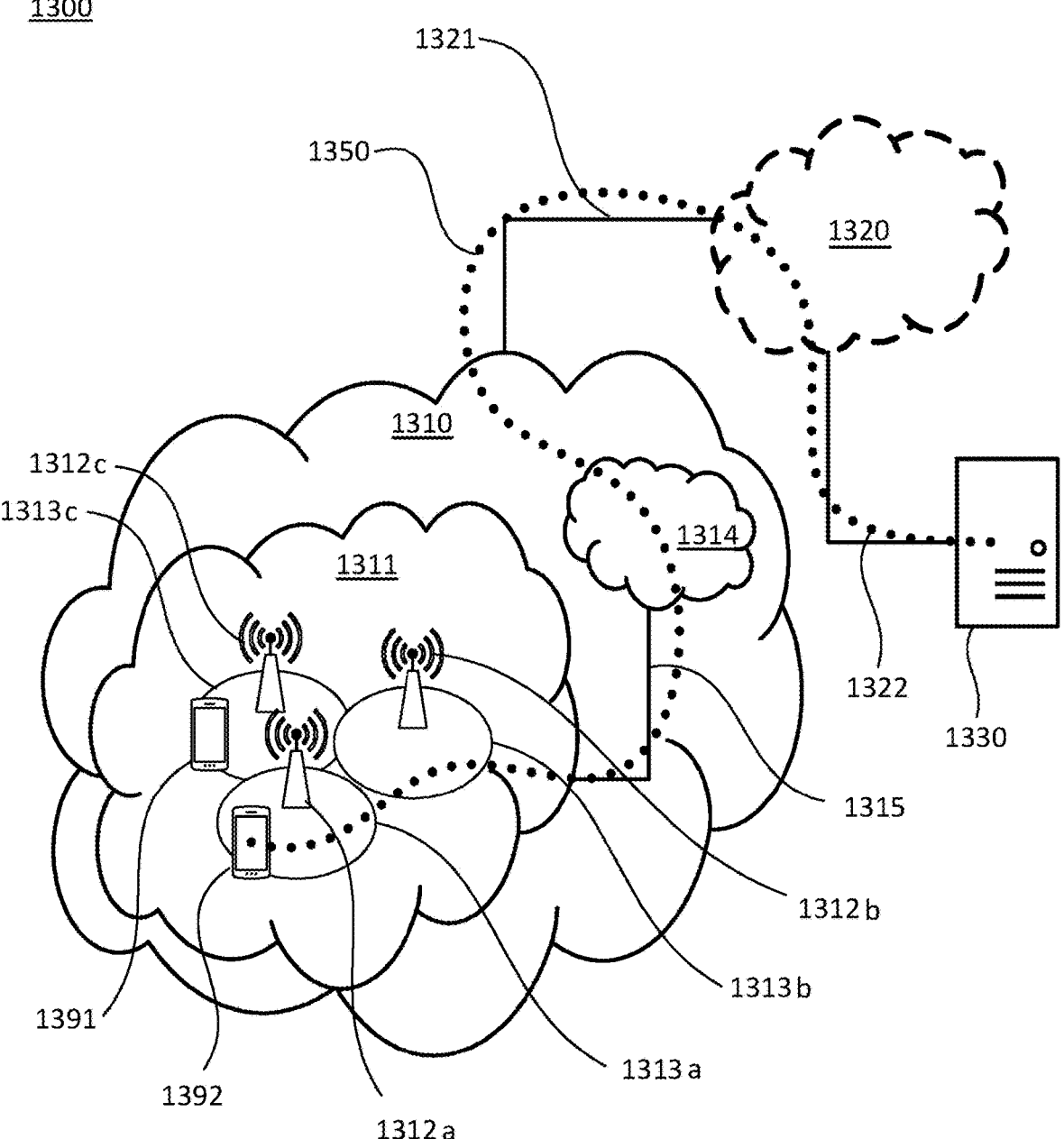
FIG. 13 schematically illustrates a telecommunication network connected via an intermediate network to a host computer.

With reference to FIG. 13, in accordance with an embodiment, a communication system 1300 includes a telecommunication network 1310, such as a 3GPP-type cellular network, which comprises an access network 1311, such as a radio access network, and a core network 1314. The access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to the core network 1314 over a wired or wireless connection 1315. A first user equipment (UE) 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

The telecommunication network 1310 is itself connected to a host computer 1330, which may be embodied in the hardware and/or software of a standalone server, a cloud-implemented server, a distributed server or as processing resources in a server farm. The host computer 1330 may be under the ownership or control of a service provider, or may be operated by the service provider or on behalf of the service provider. The connections 1321, 1322 between the telecommunication network 1310 and the host computer 1330 may extend directly from the core network 1314 to the host computer 1330 or may go via an optional intermediate network 1320. The intermediate network 1320 may be one of, or a combination of more than one of, a public, private or hosted network; the intermediate network 1320, if any, may be a backbone network or the Internet; in particular, the intermediate network 1320 may comprise two or more sub-networks (not shown).

The communication system 1300 of FIG. 13 as a whole enables connectivity between one of the connected UEs 1391, 1392 and the host computer 1330. The connectivity may be described as an over-the-top (OTT) connection 1350. The host computer 1330 and the connected UEs 1391, 1392 are configured to communicate data and/or signaling via the OTT connection 1350, using the access network 1311, the core network 1314, any intermediate network 1320 and possible further infrastructure (not shown) as intermediaries. The OTT connection 1350 may be transparent in the sense that the participating communication devices through which the OTT connection 1350 passes are unaware of routing of uplink and downlink communications. For example, a base station 1312 may not or need not be informed about the past routing of an incoming downlink communication with data originating from a host computer 1330 to be forwarded (e.g., handed over) to a connected UE 1391. Similarly, the base station 1312 need not be aware of the future routing of an outgoing uplink communication originating from the UE 1391 towards the host computer 1330.

Example implementations, in accordance with an embodiment, of the UE, base station and host computer discussed in the preceding paragraphs will now be described with reference to FIG. 14. In a communication system 1400, a host computer 1410 comprises hardware 1415 including a communication interface 1416 configured to set up and maintain a wired or wireless connection with an interface of a different communication device of the communication system 1400. The host computer 1410 further comprises processing circuitry 1418, which may have storage and/or processing capabilities. In particular, the processing circuitry 1418 may comprise one or more programmable processors, application-specific integrated circuits, field programmable gate arrays or combinations of these (not shown) adapted to execute instructions. The host computer 1410 further comprises software 1411, which is stored in or accessible by the host computer 1410 and executable by the processing circuitry 1418. The software 1411 includes a host application 1412. The host application 1412 may be operable to provide a service to a remote user, such as a UE 1430 connecting via an OTT connection 1450 terminating at the UE 1430 and the host computer 1410. In providing the service to the remote user, the host application 1412 may provide user data, which is transmitted using the OTT connection 1450. The user data may depend on the location of the UE 1430 determined in the step 206. The user data may comprise auxiliary information or precision advertisements (also: ads) delivered to the UE 1430. The location may be reported by the UE 1430 to the host computer, e.g., using the OTT connection 1450, and/or by the base station 1420, e.g., using a connection 1460.

The communication system 1400 further includes a base station 1420 provided in a telecommunication system and comprising hardware 1425 enabling it to communicate with the host computer 1410 and with the UE 1430. The hardware 1425 may include a communication interface 1426 for setting up and maintaining a wired or wireless connection with an interface of a different communication device of the communication system 1400, as well as a radio interface 1427 for setting up and maintaining at least a wireless connection 1470 with a UE 1430 located in a coverage area (not shown in FIG. 14) served by the base station 1420. The communication interface 1426 may be configured to facilitate a connection 1460 to the host computer 1410. The connection 1460 may be direct or it may pass through a core network (not shown in FIG. 14) of the telecommunication system and/or through one or more intermediate networks outside the telecommunication system. In the embodiment shown, the hardware 1425 of the base station 1420 further includes processing circuitry 1428, which may comprise one or more programmable processors, application-specific integrated circuits, field programmable gate arrays or combinations of these (not shown) adapted to execute instructions. The base station 1420 further has software 1421 stored internally or accessible via an external connection.

The communication system 1400 further includes the UE 1430 already referred to. Its hardware 1435 may include a radio interface 1437 configured to set up and maintain a wireless connection 1470 with a base station serving a coverage area in which the UE 1430 is currently located. The hardware 1435 of the UE 1430 further includes processing circuitry 1438, which may comprise one or more programmable processors, application-specific integrated circuits, field programmable gate arrays or combinations of these (not shown) adapted to execute instructions. The UE 1430 further comprises software 1431, which is stored in or accessible by the UE 1430 and executable by the processing circuitry 1438. The software 1431 includes a client application 1432. The client application 1432 may be operable to provide a service to a human or non-human user via the UE 1430, with the support of the host computer 1410. In the host computer 1410, an executing host application 1412 may communicate with the executing client application 1432 via the OTT connection 1450 terminating at the UE 1430 and the host computer 1410. In providing the service to the user, the client application 1432 may receive request data from the host application 1412 and provide user data in response to the request data. The OTT connection 1450 may transfer both the request data and the user data. The client application 1432 may interact with the user to generate the user data that it provides.

Figure 14:
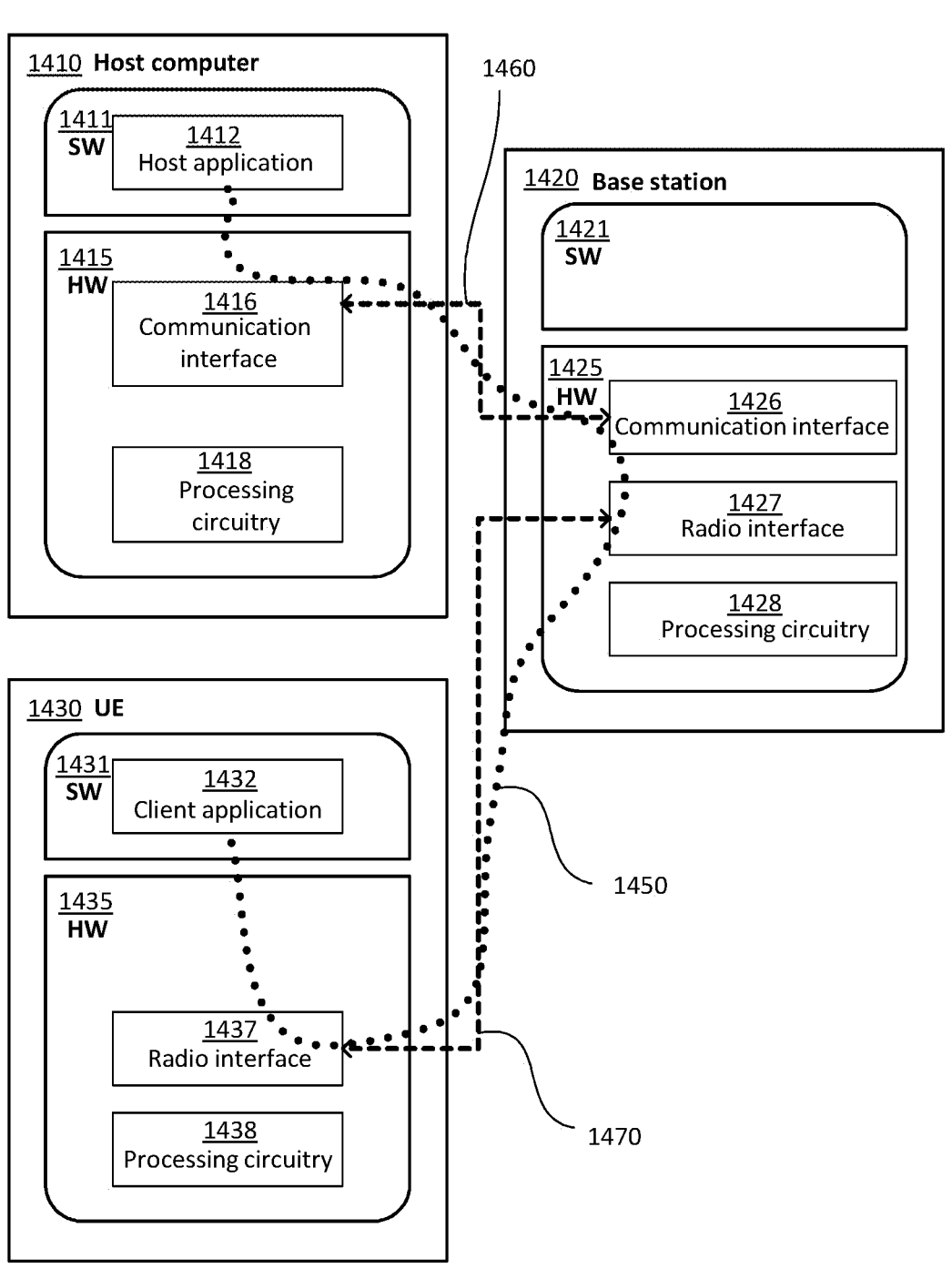
FIG. 14 shows a generalized block diagram of a host computer communicating via a base station or radio device functioning as a gateway with a user equipment over a partially wireless connection.

It is noted that the host computer 1410, base station 1420 and UE 1430 illustrated in FIG. 14 may be identical to the host computer 1130, one of the base stations 1112a, 1112b, 1112c and one of the UEs 1191, 1192 of FIG. 13, respectively. This is to say, the inner workings of these entities may be as shown in FIG. 14 and independently, the surrounding network topology may be that of FIG. 13.

In FIG. 14, the OTT connection 1450 has been drawn abstractly to illustrate the communication between the host computer 1410 and the use equipment 1430 via the base station 1420, without explicit reference to any intermediary devices and the precise routing of messages via these devices. Network infrastructure may determine the routing, which it may be configured to hide from the UE 1430 or from the service provider operating the host computer 1410, or both. While the OTT connection 1450 is active, the network infrastructure may further take decisions by which it dynamically changes the routing (e.g., on the basis of load balancing consideration or reconfiguration of the network).

The wireless connection 1470 between the UE 1430 and the base station 1420 is in accordance with the teachings of the embodiments described throughout this disclosure. One or more of the various embodiments improve the performance of OTT services provided to the UE 1430 using the OTT connection 1450, in which the wireless connection 1470 forms the last segment. More precisely, the teachings of these embodiments may reduce the latency and improve the data rate and thereby provide benefits such as better responsiveness.

A measurement procedure may be provided for the purpose of monitoring data rate, latency and other factors on which the one or more embodiments improve. There may further be an optional network functionality for reconfiguring the OTT connection 1450 between the host computer 1410 and UE 1430, in response to variations in the measurement results. The measurement procedure and/or the network functionality for reconfiguring the OTT connection 1450 may be implemented in the software 1411 of the host computer 1410 or in the software 1431 of the UE 1430, or both. In embodiments, sensors (not shown) may be deployed in or in association with communication devices through which the OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of the OTT connection 1450 may include message format, retransmission settings, preferred routing etc.; the reconfiguring need not affect the base station 1420, and it may be unknown or imperceptible to the base station 1420. Such procedures and functionalities may be known and practiced in the art. In certain embodiments, measurements may involve proprietary UE signaling facilitating the host computer's 1410 measurements of throughput, propagation times, latency and the like. The measurements may be implemented in that the software 1411, 1431 causes messages to be transmitted, in particular empty or "dummy" messages, using the OTT connection 1450 while it monitors propagation times, errors etc.

Figures 15, 16:
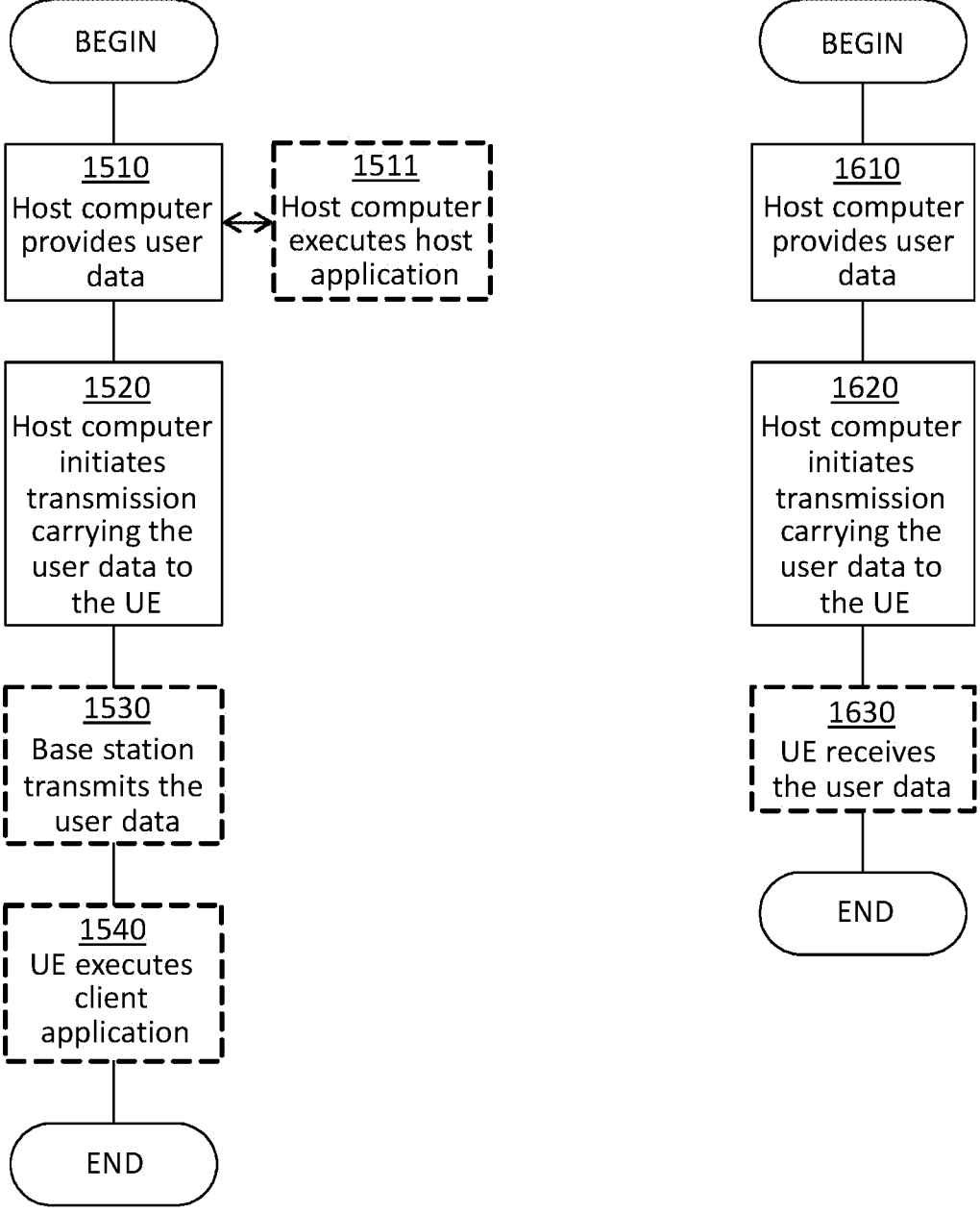
FIGS. 15 and 16 show flowcharts for methods implemented in a communication system including a host computer, a base station or radio device functioning as a gateway and a user equipment.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In a first step 1510 of the method, the host computer provides user data. In an optional substep 1511 of the first step 1510, the host computer provides the user data by executing a host application. In a second step 1520, the host computer initiates a transmission carrying the user data to the UE. In an optional third step 1530, the base station transmits to the UE the user data which was carried in the transmission that the host computer initiated, in accordance with the teachings of the embodiments described throughout this disclosure. In an optional fourth step 1540, the UE executes a client application associated with the host application executed by the host computer.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In a first step 1610 of the method, the host computer provides user data. In an optional substep (not shown) the host computer provides the user data by executing a host application. In a second step 1620, the host computer initiates a transmission carrying the user data to the UE. The transmission may pass via the base station, in accordance with the teachings of the embodiments described throughout this disclosure. In an optional third step 1630, the UE receives the user data carried in the transmission.

In any embodiment, the receiving radio device may suggest or recommend resources to other UEs. The transmitting device may utilize the resource suggestions during its resource selection procedure.

As has become apparent from above description, embodiments of the technique enable the selection of an appropriate transmission resource, which may have advantages in terms of an improved signal reception, an improved efficiency of resource utilization and/or a reduced resource selection complexity, which is particularly valuable for radio devices with limited capabilities.

For UEs with limited capabilities, e.g., P-UEs, a partial-sensing based the one or more radio resources indicated in the status message or random resource selection based on the one or more radio resources indicated in the status message can be applied. In this case, appropriate transmission resources may be selected even if a limited and/or incomplete number of radio resources are considered as candidates and/or even if a purely random selection mechanism is used.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

What is claimed is:

1. A method of operating a second user equipment configured to communicate with a first user equipment via sidelink, the method comprising:
    receiving, from the first user equipment, a first set of preferred radio resources;
    determining a second set of radio resources based on radio signals received at the second user equipment; and
    selecting at least one radio resource for transmitting data to the first user equipment from within an intersection of the first set of preferred radio resources and the second set of radio resources, wherein the at least one radio resource is defined by a time domain characteristic and/or a frequency domain characteristic.

2. The method of claim 1, wherein receiving the first set of preferred radio resources comprises receiving an indication of one or more resources preferred for data transmission if a received power measured on the one or more preferred resources is less than a predefined threshold value.

3. The method of claim 1, further comprising:
    transmitting the second set of radio resources to the first user equipment.

4. The method of claim 1, wherein receiving the first set of preferred radio resources comprises receiving an indication and/or parameters of radio resources preferred for data transmission.

5. The method of claim 1, wherein the first set of preferred radio resources is based on radio signals received at the first user equipment, the radio signals received at the first user equipment including radio signals from a radio source other than the second user equipment.

6. The method of claim 1, wherein the radio signals received at the second user equipment include radio signals received from a radio source other than the first user equipment.

7. The method of claim 1, wherein determining the second set of radio resources comprises performing a sensing procedure at the second user equipment.

8. The method of claim 1, wherein receiving the first set of preferred resources comprises periodically receiving the first set of preferred radio resources.

9. The method of claim 1, wherein receiving the first set of preferred resources comprises receiving the first set of preferred radio resources in response to transmitting a request.

10. The method of claim 1, the method further comprising:
    transmitting a request to receive the first set of preferred radio resources to the first user equipment.

11. The method of claim 1, wherein receiving the first set of preferred radio resources comprises receiving the first set of preferred radio resources in a unicast mode.

12. The method of claim 1, wherein receiving the first set of preferred radio resources comprises receiving the first set of preferred radio resources using Sidelink Control Information ("SCI").

13. The method of claim 1, wherein receiving the first set of preferred radio resources comprises receiving the first set of preferred radio resources in a Medium Access Control ("MAC") layer.

14. A second user equipment configured to communicate with a first user equipment via sidelink, the second user equipment comprising:

processing circuitry; and memory coupled to the processing circuitry and having instructions stored therein that are executable by the processing circuitry to cause the second user equipment to perform operations comprising:

receiving, from the first user equipment, a first set of preferred radio resources;

determining a second set of radio resources based on radio signals received at the second user equipment; and selecting at least one radio resource for transmitting data to the first user equipment from within an intersection of the first set of preferred radio resources and the second set of radio resources, wherein the at least one radio resource is defined by a time domain characteristic and/or a frequency domain characteristic.

15. The second user equipment of claim 14, wherein receiving the first set of preferred radio resources comprises receiving an indication of one or more resources preferred for data transmission if a received power measured on the one or more preferred resources is less than a predefined threshold value.

16. The second user equipment of claim 14, the operations further comprising:

transmitting the second set of radio resources to the first user equipment.

17. The second user equipment of claim 14, wherein the first set of preferred radio resources is based on radio signals received at the first user equipment, the radio signals received at the first user equipment including radio signals from a radio source other than the second user equipment.

18. The second user equipment of claim 14, wherein the radio signals received at the second user equipment include radio signals received from a radio source other than the first user equipment.

19. The second user equipment of claim 14, wherein determining the second set of radio resources comprises performing a sensing procedure at the second user equipment.

20. The second user equipment of claim 14, wherein receiving the first set of preferred resources comprises receiving at least one of:

an indication and/or parameters of radio resources preferred for data transmission;

the first set of preferred radio resources periodically;

the first set of preferred radio resources in response to transmitting a request;

the first set of preferred radio resources in a unicast mode;

the first set of preferred radio resources using Sidelink Control Information ("SCI"); and the first set of preferred radio resources in a Medium Access Control ("MAC") layer.

21. The second user equipment of claim 14, the operations further comprising:

transmitting a request to receive the first set of preferred radio resources to the first user equipment.

22. A non-transitory computer readable medium having instructions stored therein that are executable by processing circuitry in a second user equipment that is configured to communicate with a first user equipment via sidelink, the instructions executable to cause the second user equipment to perform operations comprising:

receiving, from the first user equipment, a first set of preferred radio resources;

determining a second set of radio resources based on radio signals received at the second user equipment; and selecting at least one radio resource for transmitting data to the first user equipment from within an intersection of the first set of preferred radio resources and the second set of radio resources, wherein the at least one radio resource is defined by a time domain characteristic and/or a frequency domain characteristic.

* * * * *